United States Patent
Nguyen et al.

(10) Patent No.: US 9,015,612 B2
(45) Date of Patent: Apr. 21, 2015

(54) VIRTUAL ROOM FORM MAKER

(75) Inventors: Djung Nguyen, San Diego, CA (US); Ted Dunn, Carlsbad, CA (US); Andy Nguyen, San Diego, CA (US); Nobukazu Sugiyama, San Diego, CA (US); Lobrenzo Wingo, San Diego, CA (US)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 13/223,559

(22) Filed: Sep. 1, 2011

(65) Prior Publication Data

US 2012/0117502 A1    May 10, 2012

Related U.S. Application Data

(60) Provisional application No. 61/411,981, filed on Nov. 10, 2010, provisional application No. 61/411,538, filed on Nov. 9, 2010.

(51) Int. Cl.
| | |
|---|---|
| *G06F 3/048* | (2013.01) |
| *H04S 7/00* | (2006.01) |
| *G06T 7/00* | (2006.01) |
| *G06K 9/00* | (2006.01) |
| *G06K 9/32* | (2006.01) |

(52) U.S. Cl.
CPC ............. *H04S 7/301* (2013.01); *G06T 7/0065* (2013.01); *G06K 9/0057* (2013.01); *G06K 9/3216* (2013.01); *G06K 2009/3225* (2013.01); *H04R 2225/55* (2013.01)

(58) Field of Classification Search
CPC ........... H04R 5/02; G06F 3/048; G06F 15/16; H04N 21/43615; H04N 21/485
USPC ........................................................ 715/769
See application file for complete search history.

(56) References Cited

U.S. PATENT DOCUMENTS

| | | | |
|---|---|---|---|
| 2,179,840 A * | 11/1939 | Bucky | 381/334 |
| 6,839,438 B1 | 1/2005 | Riegelsberger et al. | |
| 2003/0007648 A1 | 1/2003 | Currell | |
| 2003/0198353 A1* | 10/2003 | Monks et al. | 381/58 |

(Continued)

FOREIGN PATENT DOCUMENTS

| | | |
|---|---|---|
| JP | 7175468 | 7/1995 |
| WO | WO 2007/028094 | 3/2007 |

OTHER PUBLICATIONS

Bryan Gladstone, CARA (Computer Aided Room Acoustics) Room Acoustics software, Positive Feedback Online, Issue 8, pp. 1-7.*

(Continued)

*Primary Examiner* — William Bashore
*Assistant Examiner* — Jeanette J Parker
(74) *Attorney, Agent, or Firm* — Sony Corporation

(57) ABSTRACT

A method consistent with certain implementation involves presenting a graphical user interface (GUI) to a user on a display, where the GUI presents a visual representation of a room that is adapted to be adjusted in size and shape by user manipulation of a controller; the GUI has a drop and drag menu adapted to selection of an object from a plurality of objects for placement at any selected position within the room; at least one of the objects comprising a loudspeaker; and where the GUI provides for input of data characterizing the loudspeaker. This abstract is not to be considered limiting, since other embodiments may deviate from the features described in this abstract.

19 Claims, 21 Drawing Sheets

(56) References Cited

U.S. PATENT DOCUMENTS

| | | | |
|---|---|---|---|
| 2003/0198357 A1* | 10/2003 | Schneider et al. | 381/94.2 |
| 2004/0258259 A1* | 12/2004 | Koyama | 381/307 |
| 2005/0078833 A1 | 4/2005 | Hess et al. | |
| 2005/0179701 A1 | 8/2005 | Jahnke | |
| 2005/0198095 A1* | 9/2005 | Du et al. | 709/200 |
| 2008/0126020 A1* | 5/2008 | Hoguet | 703/1 |
| 2009/0129602 A1* | 5/2009 | Konagai et al. | 381/17 |
| 2010/0064321 A1 | 3/2010 | Lee et al. | |
| 2010/0195444 A1 | 8/2010 | Choisel et al. | |
| 2010/0198426 A1 | 8/2010 | Kondo et al. | |
| 2010/0211897 A1* | 8/2010 | Cohen et al. | 715/764 |
| 2010/0305725 A1 | 12/2010 | Brannmark et al. | |
| 2010/0318917 A1* | 12/2010 | Holladay et al. | 715/735 |
| 2011/0091055 A1* | 4/2011 | LeBlanc | 381/303 |

OTHER PUBLICATIONS

Anonymous, MultEQ from Audyssey, Room Equalization for Clean and Balanced Sound, Audyssey website, 2011.

Penha, Rui, Distance Encoding in Ambisonics Using Three Angular Coordinates, Fifth Sound and Music Computing Conference (SMC08), Jul. 31, 2008.

Malham, David, et al., 3D Sound Spatialization Using Ambisonic Techniques, Computer Music Journal, 19:4, pp. 58-70, 1995.

Eda, Kazushi, et al., Acoustical Effects of Columns, Beams and Furniture on Sound Fields in Small Enclosures, Proceedings of $20^{th}$ International Congress on Acoustics, ICA, 2010, Sydney, Australia, Aug. 2010.

Naef, Martin, et al., Spatialized Audio Rendering for Immersive Virtual Environments, Nov. 2002.

\* cited by examiner

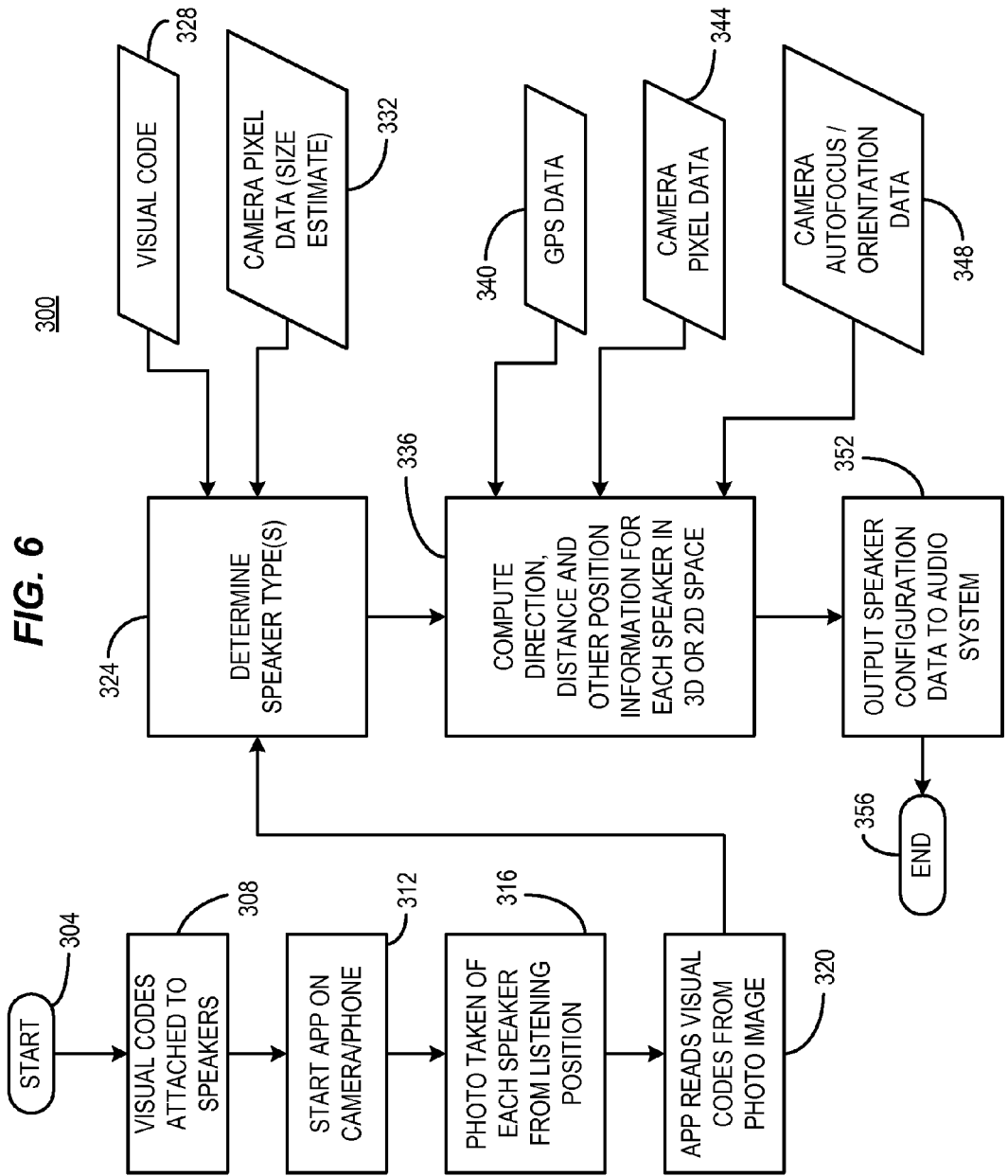

VIRTUAL ROOM FORM MAKER

CROSS REFERENCE TO RELATED DOCUMENTS

This application is related to and claims priority benefit of U.S. Provisional Patent applications No. 61/411,981 filed Nov. 10, 2010, and 61/411,538 filed Nov. 9, 2010 which are hereby incorporated by reference.

This application is also related to U.S. patent application Ser. No. 13/223,679 filed Sep. 1, 2011 entitled "DETERMINING LOUDSPEAKER LAYOUT USING VISUAL MARKERS" and U.S. patent application Ser. No. 13/223,584 filed Sep. 1, 2011 entitled "AUDIO SPEAKER SELECTION FOR OPTIMIZATION OF SOUND ORIGIN", each of which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Psycho-acoustic signal processing is often utilized to produce special effects in a multi-channel audio system. For example, by proper mixing of audio signals in a two channel stereo audio system, sounds can appear to emanate from locations other than the two loudspeakers (speakers). For example, a sound can be mixed between the two loudspeakers so that it appears to emanate from between the two loudspeakers. This effect is often used to simulate the sound of a passing automobile that appears to move from left to right or vice versa. With larger numbers of loudspeakers, more dramatic audio effects are commonly produced.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 6 is an example flow chart of a process for using a camera device to define a loudspeaker layout in a manner consistent with certain embodiments of the present invention.

DETAILED DESCRIPTION

Figure 2:
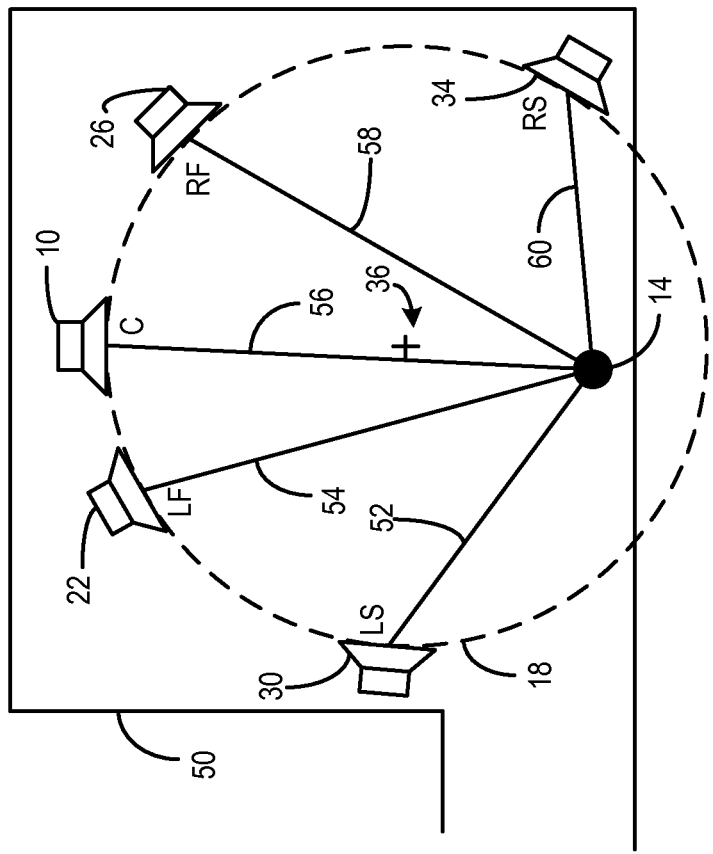
FIG. 2 is an example of a loudspeaker arrangement adapted to an imperfect room arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "psychoacoustic" is commonly used to refer to a phenomenon wherein signals presented to two or more loudspeakers are used to simulate a position of a virtual loudspeaker from which a sound appears to a human to emanate. However, while not strictly in keeping with standard usage, the term as used herein is to be more broadly interpreted to additionally include the assignment of any single loudspeaker to reproduce a sound so that the sound appears to come from the position of that single loudspeaker.

Run Time Remixing of Audio Channels

Using Speaker Maps, as will be discussed later, a process is defined that mixes or selects audio channels to adjust for spacing and relative position of the speakers in a room. This process allows precise sound placement in a room to create an enhanced surround sound experience.

Figure 1:
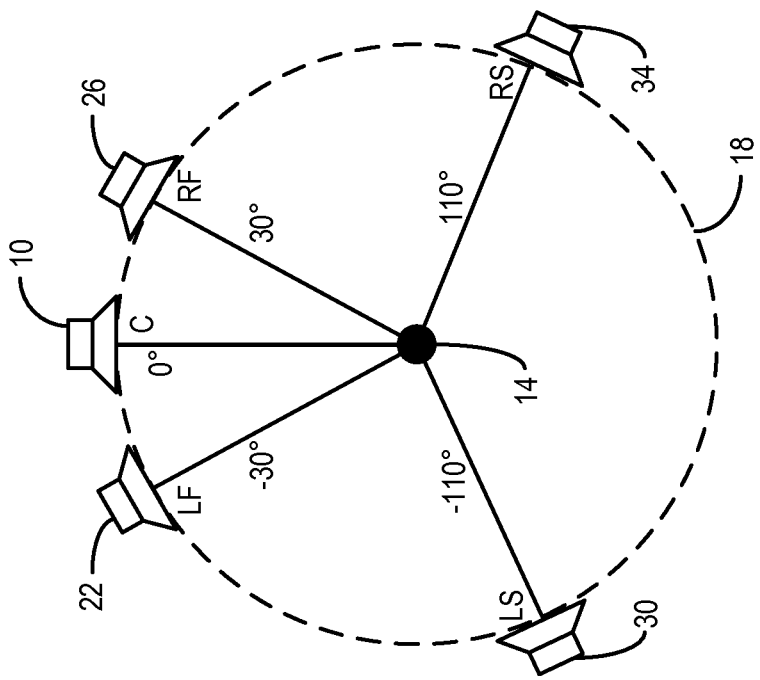
FIG. 1 shows an example of an ideal five channel surround sound arrangement where the loudspeaker placement or virtual placement is consistent with certain embodiments of the present invention.

In a home theater environment, the physical geographic placement of the loudspeakers should replicate the ideal placement used by the recording engineer if one is to precisely or closely reproduce the sound as mixed at a recording studio. Additionally, the layout, furnishing and materials in the room will significantly affect the sound reproduction quality in any given room. Depending on the number of speakers in a room, there are different recommended layouts. One commonly accepted 5.1 channel layout for the five primary channels (ignoring the subwoofer for this discussion since its placement is subject to different criteria) is the ITU 5.1 layout as depicted in FIG. 1. In this layout, the center channel loudspeaker 10's orientation with respect to a central listening position 14 is the an angular reference at zero degrees with a radius of a circle being the distance between the listening position 14 and the center channel loudspeaker 10. The other loudspeakers are situated at the same radius from the listening position 14 with left front and right front loudspeakers 22 and 26 respectively being situated 30° off center in the front respectively. The left surround (left rear) and right surround (right rear) loudspeakers 30 and 34 respectively are situated 110° from the center channel loudspeaker 10 and thus slightly to the rear of the listening position 14 in this configuration.

However due to room layouts, furniture, pathways and other impediments, it is usually not possible to place speakers in the ideal position. Nor is the ideal listening position likely to be possible in most real world living rooms. A room may have furniture, windows, or doors overlapping with the speaker's ideal position. Moreover, the furnishings and room materials used for walls, floors, etc. will affect the "sound of the room". Most audio/video (A/V) receivers provide a room calibration function that is used to attempt to compensate for an odd layout of a room. While some processes are more advanced than others, most common room calibrations simply adjust each channel's volume level in an attempt to ensure balanced loudness from each loudspeaker.

It is desirable to take room calibration further in order to better reproduce recorded, broadcast and playback sound as engineered. When a source input is received, in accord with certain implementations consistent with embodiments of the present invention, a process determines the best method available to output the source taking into account the room setup. Using a Speaker Map (as will be discussed later), the process chooses among several different methods to output the source. Since the output is dependent on the numbers of loudspeakers speakers in system and as mapped by the Speaker Map and the geometric configuration of those loudspeakers, certain example processes as described herein are not bounded to the predetermined channels of the source input. For instance a 5.1 channel Source Input can be downmixed to a 2 channel layout or up mixed to an 8.1 speaker layout. A goal of certain implementations of the process is handle any number of speakers in any configuration while still achieving a high degree of accuracy in sound placement. In such processes, the result can be to provide a scalable audio system, compensating for oddly placed loudspeakers, a full remapping of loudspeakers in a room or removing need for a 3rd party codec. In accord with certain implementations, any number of loudspeakers could be added as a room can accommodate them so as to enhance the accuracy of the apparent placement of a source of the sound in the room.

High quality reproduction of sound depends as much on the environment as the equipment. Degradation can be caused, for example, in a glass walled room with misplaced but expensive high quality loudspeakers and may be no better than or even worse than an acoustically apportioned theater with perfectly laid out but poor quality loudspeakers. One aspect of accurate high fidelity audio is the proper localization of the recorded sounds. One commonly recognized example is in movie sound effects where a car roars from the back to the front of the room. When the movie is played back in a poorly designed room (from an audio perspective) such as the example glass walled room with misplaced loudspeakers, the sound effect may not be easily recognized as moving from the back to the front. This is one of the issues addressed herein, because in the common home environment, most rooms are not designed for optimum acoustic performance, and changes are unlikely to be made to the walls, floor, furniture, and even loudspeaker speaker positions (to a large extent) to provide optimum audio performance.

The more information the audio reproduction system knows about the environment the better it can ameliorate its deficiencies. In particular where each loudspeaker is located has a significant impact on how accurate sounds are perceived spatially relative to a location where they were intended when encoded. Although a common setting in modern audio-video receivers is individual speaker volume and delay values this is not sufficient for knowing each loudspeaker's location and particularly each loudspeaker's three-dimensional geographic location within a particular room.

A Speaker Map as described herein is coordinate system that can be used to represent the locations of all speakers within a room. At minimum in one example the coordinates are signed distances to three mutually perpendicular planes. An Anchor Point in a Speaker Map may be referenced as the origin, or the fixed point of reference. Beside the loudspeaker locations, the type of loudspeaker and their radiation pattern is also preferably considered in order to provide optimal Spatial acoustics. Since the topic of automatically determining these parameters is as broad as determining the locations of speakers, several basic assumptions are made to simplify the current explanation, without intent to limit any embodiment of the invention. In the present examples, it is assumed that the type of loudspeakers and their radiation pattern, frequency response, efficiency, and other relevant characteristics are already known, either through user input or predetermined configurations, such as a commercial "home theater in a box" would provide.

Speaker Maps

Certain example processes of creating a "Speaker Map" can be broken into two parts. The first part is to measure all speakers against a point of reference. The measurement can be distances only, or a combination of distances and angles. An example of speaker measurement is to say "the Left speaker is 3 feet to left, 2 feet above, and 4 feet to the front of the listener's head", where in this case, a listening position (the listener's head) is used as a reference point. Another way to describe the left speaker using distance and angle is to say "the Left speaker is 6 feet away 36 degree to the right and 12 degrees above the listener's head". In both cases, the measurements used are different, but describe the same loudspeaker location.

The point of reference (reference point or reference location or anchor point) is an arbitrary point in three-dimensional space that is used as part of the measurement. When all loudspeakers reference the same reference point, the math to find the coordinates becomes much simpler. In the previous example, the anchor point is the listener's head. If the listener were to move 3 feet away, then the measurements would become invalid. Hence, the anchor point should remain fixed in geometric location, otherwise new measurements are required.

The second part is to define a coordinate system using trigonometry based algorithms in which all loudspeakers and the listening point or reference point reside. The measurements from the first part are used as parameters in the algorithm. The complexity of the algorithm will varies on the type of measurement used.

It is noted that in most real world situations, there are likely multiple listeners in a room, in multiple locations in three dimensional space. As a result, as with all audio systems, although the audio can be optimized for a given room and a given listening point, if there are multiple listeners or the listener moves from the design listening point, the audio observed at the new listening point will be adversely affected. Hence, in real world systems, the selection of the listening point may be a compromise or average established for multiple listening points (e.g., the center of a sofa, where others may be seated slightly to the left and right of the center).

Determining Speaker Distances and Angles

There are many methods to determine speaker distances and angles. Each method varies in ease of use, accuracy and overall practicality. The methods disclosed herein are broken down into three types; input from users, measurement of visual markers, and measurement of audio markers.

A. Input from Users

In this method of speaker measurement the user inputs the speaker's position via a Graphical User Interface, an example of which will be described later. How much data the user is required to input can vary per application. The more measurements and room and loudspeaker details the user enters the more the better the system can potentially be characterized, but this may also decrease the ease of use for the user. Also, the accuracy of the measurement will depend on the accuracy of the user's input. A meticulous user can measure each speaker to the nearest centimeter, or simply put in best guess estimate in feet or even yards.

One advantage of this method is the ability to input additional information about the room. Items like furniture, windows, and walls can be taken into account in characterizing a given room's acoustic behavior. Given the proper GUI, the user can map out his entire floor plan giving the most information possible not just for acoustic, but for other applications as well. On the other hand, a drawback is relative ease of use for such an application unless the interface is appropriately designed. An appropriate balance should preferably be struck between having the user tediously measure and input distances while not over-simplifying the application to produce an inadequate amount of information to generate a solid model of the listening environment.

FIG. 2 depicts one example result of a user's input of loudspeaker locations via a GUI (or any other mechanism) for an example room 50 using the same loudspeaker designations, listening position designation 14 and a reference circle designated 18 as those used in FIG. 1 for convenience. However, it is noted that in this example, while the loudspeakers are situated along circle 18, the listening position is not at the center (shown with a cross 36) and the loudspeakers are not situated at proper angles and distances with respect to the listening position. Nevertheless, an arrangement such as this is common where a television set might be situated near the center channel loudspeaker 10, and the user might be sitting on a couch on the opposite side of the room 50. The room boundaries and the hallway opening restrict proper loudspeaker placement as does the desire to locate a couch against a wall at the listening position (which prevents the surround channel loudspeakers 18 and 34 from being situated behind the listening position at 110 degrees).

In one simple example implementation, a user could be asked to input a plurality of vector distances from the listening position 14 designated as 52, 54, 56, 58 and 60 along with angles for each vector referenced to any suitable reference in order to define the x-y coordinates of the loudspeakers. The position of each loudspeaker in the z direction (height) with respect to the head position at 14 can be separately entered along with an indication of the characteristics of each loudspeaker. Commonly, at least four of the five loudspeakers may be the same with a different center channel loudspeaker, and in some instances the rear channel loudspeakers may be different from the front channel left and right loudspeakers. The indication of the characteristics can be detailed such as a model number which indicates most of the relevant loudspeaker characteristics or may be something as simple as a size designation such as "large", "mid-sized" or "small" to give the system an estimate of its frequency response and radiation pattern.

One implementation consistent with the GUI contemplated herein is referred to as a Virtual Room Form Maker which is an application that either runs on an A/V receiver processor or television or dedicated appliance with the television used as a display, or alternatively, using a computer connected to the A/V receiver facilitates an easy mechanism for a user to input a description of their room environment. This application provides for an easy method for audio calibration.

Current home audio setup is not accurate nor is it simple for users so this application complements the audio hardware to allow users to draw their specific room environment. Such setup arrangements generally only permit the user to adjust loudness of each loudspeaker. In the present implementation, the users define room dimensions, materials in the room, equipment in the room, furnishings and any other objects or materials which would impact the reflections of sound. The user interface generally resembles so-called "drop and drag" interfaces for graphics programs used, for example, for room layouts and interior design. The objects dropped into place in a room having defined sizes are then complimented with information about the materials which are used to determine the acoustic behavior of the room. The behavior can be defined simply by coarse categories (e.g., lively, dead, average) or in substantially greater detail. For example, if a clear obstruction between a listening position and a loudspeaker exists, this can be accounted for to some degree in the signal level applied to that particular loudspeaker as well as actual selection of loudspeakers selected for use and method of using them to actually localize a sound within the acoustic field. As the processing power available to analyze and model the room acoustics is refined, the system's performance can be fine tuned for a given room and set of loudspeakers to a greater degree.

With this implementation, the users define specific materials in the room such as wooden doors, drywall materials, glass windows, brick, plaster, paneling, rugs, drapes, furniture, furnishing materials, etc. Each different material reflects or absorbs sounds differently and in order to setup an audio system correctly such reflections and absorptions can be taken into consideration to better tune the system to the room and optimize the audio experience.

Figure 3:
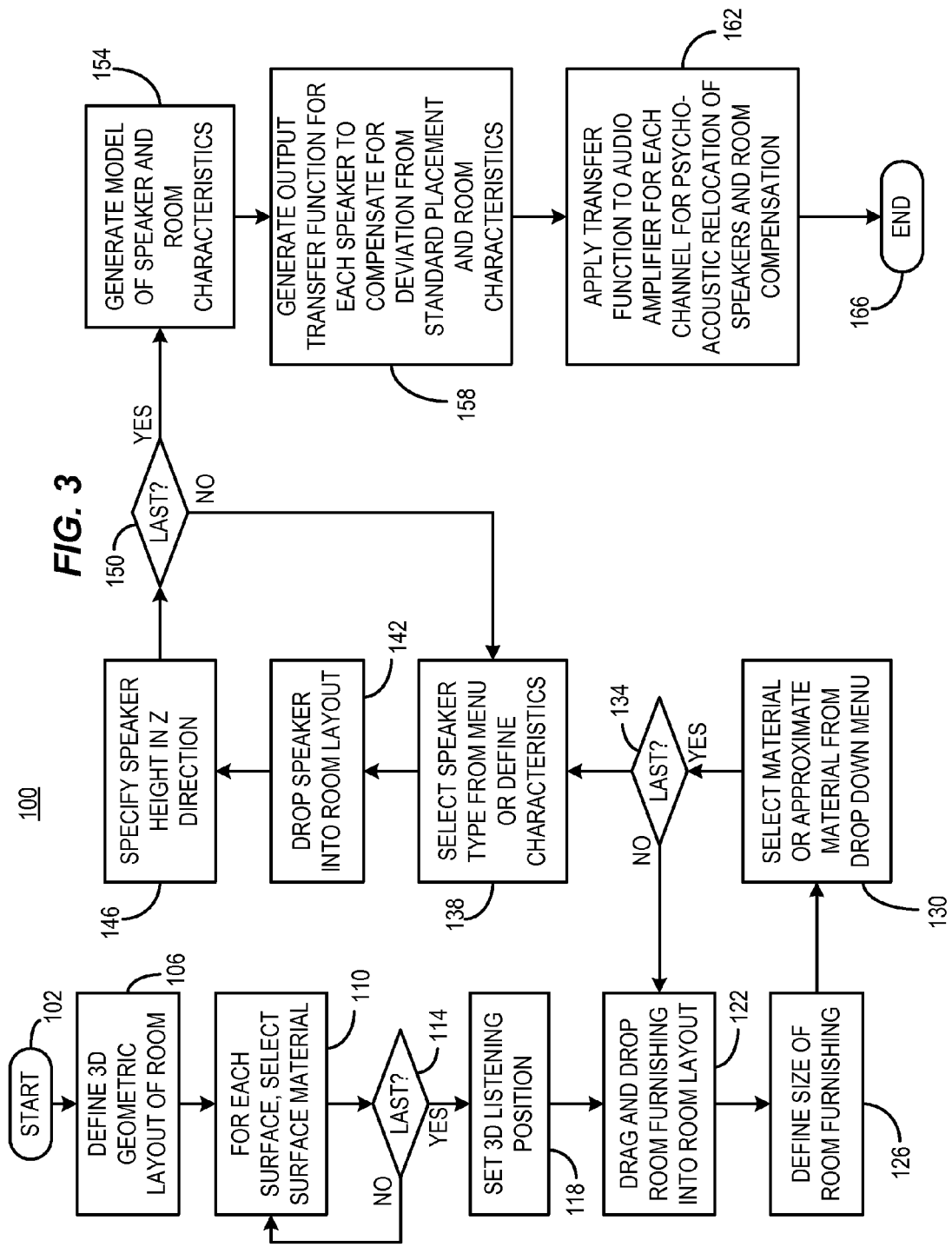
FIG. 3 is an example flow chart of a method of entering room and furnishing layouts in a manner consistent with certain embodiments of the present invention.

One example of a user input process consistent with this implementation is depicted as process 100 of FIG. 3, starting at 102. In this example, the user systematically defines the room geometry and layout of furnishings as well as placement of loudspeakers using a graphical representation. The placement of furnishings, loudspeakers and room arrangement can be carried out in a manner similar to that used by simple computer-aided drafting (CAD) programs such as those used by interior designers to depict a room layout, or similar to those used by kitchen designers to place cabinets. While the order depicted systematically carries the user through a process for defining a room, variations in the order and program details can readily be implemented without departing from implementations consistent with certain embodiments. At this writing, CAD programming is quite advanced and there is no need to provide actual details of such programming in order for one skilled in the art to be able to provide an implementation of a suitable graphical interface and CAD engine for the user to input the data. The modeling can be done in two dimensions or three.

In this example, at 106, the user defines the geometric layout of the room. The program, for example may start with a square room in which the user inputs wall lengths and then drags and drops room features such as an opening (to another room), a fireplace, a door, a window, a bay window, etc. to various locations along the walls. The user further defines by modification of defaults or direct entry into a data field or selection from a menu data such as the height of ceiling and materials to provide a shell model of the empty room. In another embodiment, the room may include a default loudspeaker layout that is then simply manipulated as desired to properly place the loudspeakers in the room.

Once the room's geometry is defined, or during definition of the room's geometry, the user selects materials for the walls, ceiling, floor and features such as doors, windows, window coverings, floor coverings and other reflective or absorptive surfaces in the room at 110. This may be carried out as an iterative process for each surface where the user selects a surface either manually or under directive from the program and then selects a closest fit to the particular material of the structure (e.g., wood, stucco, drywall, plaster, wood paneling, hardwood, draperies, carpet, glass, brick, tile, etc.).

When all surfaces are accounted for at 114, a listening position can be defined at 118 including x, y and z positions, for example by dragging a listening position icon to a desired location and either accepting a default such as 4 feet (approximating a seated head position) or modifying the default by manual input. If the room is depicted in two dimensions at this point, the listening position can be dragged into the room and the height specified in a drop-down window. In each case, the actions are preferably carried out using a television remote controller to move objects on screen to their desired position and selections made in a conventional selection mechanism using the remote control, but other alternatives including use of a computer for the data input may also be used.

At 122, various furnishings can be dropped into place in the room such as chairs, tables, bookcases, cabinets, couches, etc. This can be done by selecting an object from a menu and moving the object into the room's on-screen shell. In each case the size of the room furnishing can be specified at 126 and the material selected or approximated at 130. Once the last furnishing has been characterized at 134, the user can begin a process of placement and characterization of the loudspeakers (or movement of loudspeakers from a default position). However, other orderings of the present operations are possible without departing from embodiments consistent with the invention.

In this example, the loudspeakers can be selected by model or size from a menu which may define the characteristics of the speaker or may use stored characteristics such as audio pattern and frequency response. When such information is not available, default values can be selected. This portion of the process begins at 138 where the loudspeaker is selected from a menu and then dropped into the room layout at 142. When dropped into place, the loudspeaker can be rotated to approximate the angular position and the height can be defined at 146. This process iterates until the last loudspeaker has been placed at 150. Speaker placement can be adjusted by selection of a speaker with the cursor and then moving it with navigation commands.

Once the information input is completed, the system can create a model of the room and loudspeaker characteristics at 154. This information can be used to generate output transfer functions at 158 for each audio channel to compensate for room characteristics and sub-optimal loudspeaker placement. This transfer function can then be applied to each audio channel in an audio amplifier at 162 to account for the room characteristics and to use psycho-acoustic location or relocation of one or more of the loudspeakers and selection of appropriate loudspeaker(s) to accomplish placement of sound sources in a desired location for enhancement to the audio experience. The process ends at 166. At 162, the process is referred to as psycho-acoustic relocation of apparent sound sources, but the reader is referred to both accepted definitions for psycho-acoustics and the definition provided above throughout this document wherein the term also may refer to selection of a single loudspeaker for direct reproduction of a particular sound.

Figure 4:
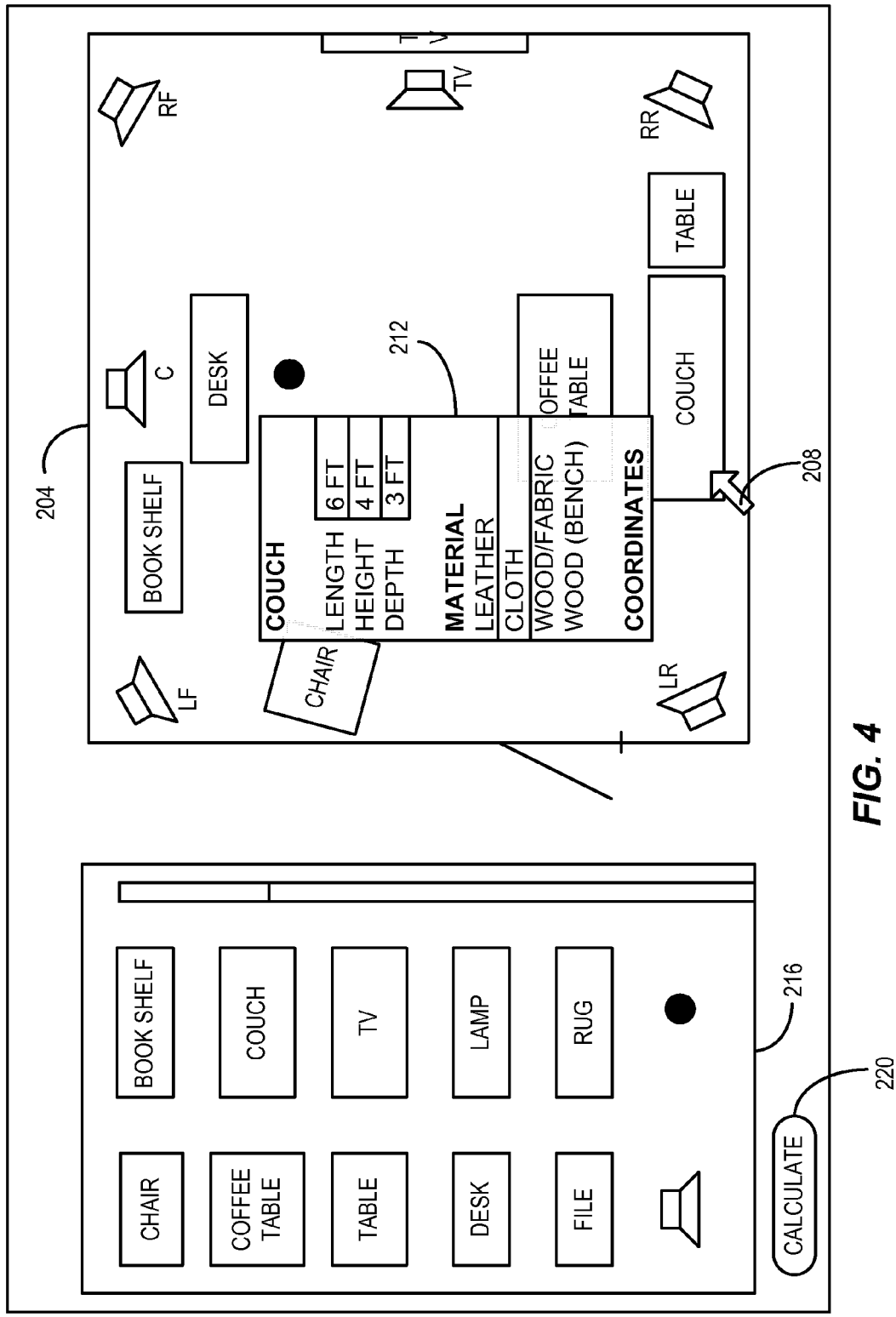
FIG. 4 is an example of a graphical user interface (GUI) for a tool used to enter room and furnishing and loudspeaker data in a manner consistent with certain embodiments of the present invention.

A non-limiting example of a GUI 200 suitable for use in connection with the present implementation is depicted in FIG. 4. In certain implementations, this GUI is displayed on a television display connected to an A/V amplifier that processes the audio signals in a multi-channel audio environment. Control of the GUI is accomplished using a remote controller as an input mechanism to manipulate placement of objects in the room and to directly input measurements and the like as needed. In this example, the room has been assembled and is represented graphically in display window 204 on the right of the screen.

In this example, the room has largely been defined along with loudspeaker locations and furniture that are dragged into place from menu 216 on the left. The cursor 208 is currently situated over a couch and window 212 indicates size and material parameters of the couch. Other parameters including the x, y, and z or polar coordinates from an origin (as will be described later) may also be available in the window 212. The user can select or modify the parameters from this window and can add furnishings from the scrolling window 216 on the left using the familiar drag and drop approach. Window 216, in an example embodiment, includes not only furnishings but also loudspeakers for placement and the primary listening position (represented by the dot). In this manner, building the room model is seamless with appropriate menus that pop up when a new item is placed in the room or when an existing item is selected or moved. In this image, the window defines the size and other parameters of the couch, but if the cursor 208 were situated over a loudspeaker, a window could present any number of parameters of the loudspeaker including model number or general attribute such as size, efficiency, radiation pattern and frequency as well as coordinates in the room.

Once the room model is completed to the user's satisfaction, the "calculate" tab 220 can be selected in order to create the acoustic model and psycho-acoustic transfer functions. In other implementations, the user simply finishes to begin the creation of the acoustic model or the acoustic model may be created iteratively as the room is being "built" on screen. The room furnishings can be used to determine that the room is "dead" or "lively" acoustically, to determine if the sound from a loudspeaker is muted or scattered and/or to determine that the speaker placement should be altered psycho-acoustically and thus determine how to virtually relocate the loudspeaker. The literature includes numerous papers and patent documents that describe methods for compensation for obstructions and absorptive or reflective conditions that can be utilize to refine an acoustic model for the room. Reverberation effects can be selectively added to liven an acoustically dead room (heavily damped with few or no reflective echoes) or withheld to deaden a lively room, or phase shifts and delays can be applied to compensate for reflections. Other possibilities will occur to those skilled in the art upon consideration of the present teachings.

Thus, a method consistent with the present teachings involves presenting a graphical user interface (GUI) to a user on a display, where the GUI presents a visual representation of a room that is adapted to be adjusted in size and shape by user manipulation of a controller as in 106-118. The GUI has a drop and drag menu such as in 122 adapted to selection of an object from a plurality of objects for placement at any selected position within the room. At least one of the objects includes a loudspeaker as in 138, where the GUI provides for input of data characterizing the loudspeaker.

In certain implementations, at least one of the objects comprises a room furnishing as in 122. In certain implementations, the GUI provides for selection of a characteristic of the room furnishing. In certain implementations, the display comprises a television display. In certain implementations, the controller comprises a television remote controller. In certain implementations, a plurality of loudspeakers are placed within the room and further comprising constructing a Speaker Map representing a geometric placement of a plurality of loudspeakers placed within the room.

An apparatus consistent with the above has one or more processors and a display that under the control of the one or more processors presents a graphical user interface (GUI) to a user on the display, where the GUI presents a visual representation of a room that is adapted to be adjusted in size and shape by user manipulation of a controller. The GUI has a drop and drag menu adapted to selection of an object from a plurality of objects for placement at any selected position within the room. At least one of the objects is a loudspeaker, where the GUI provides for input of data characterizing the loudspeaker.

In certain implementations, at least one of the objects comprises a room furnishing. In certain implementations, the GUI provides for selection of a characteristic of the room furnishing. In certain implementations, the display comprises a television display. In certain implementations, the controller comprises a television remote controller. In certain implementations, a plurality of loudspeakers are placed within the room where the one or more processors constructs a Speaker Map representing a geometric placement of a plurality of loudspeakers placed within the room. In certain implementations, a memory is provided where the Speaker Map is stored to the memory. In certain implementations, the one or more processors are embedded within a multi-channel audio amplifier.

Another apparatus consistent with the above has one or more processors residing within a multi-channel audio amplifier. A television display that under the control of the one or more processors presents a graphical user interface (GUI) to a user on the display, where the GUI presents a visual representation of a room that is adapted to be adjusted in size and shape by user manipulation of a remote controller. The GUI has a drop and drag menu adapted to selection of an object from a plurality of objects for placement at any selected position within the room. A plurality of the are loudspeakers in an array. The GUI provides for input of data characterizing the loudspeaker. A plurality of loudspeakers is placed within the room, where one or more processors constructs a Speaker Map representing a geometric placement of a plurality of loudspeakers placed within the room. A memory stores the Speaker Map.

In certain implementations, at least one of the objects comprises a room furnishing. In certain implementations, the GUI provides for selection of a characteristic of the room furnishing.

Any of the above processes can be carried out using a tangible computer readable storage medium storing instructions that when carried out on one or more programmed processors forming a part of a camera device. The storage medium can be any suitable storage medium including so-called non-transitory storage media, where "non-transitory" is intended only to distinguish the term over transitory propagating signals.

B. Measurement of Visual Markers

This method of mapping a room uses a portable device's (e.g., a cellular telephone) digital camera and related capabilities to measure distance from images. Building on the previously described method, an application can be created to use a camera to determine the measurements and relay the information to the system in order to build an acoustic model of a room. This type of application is often associated with augmented reality, but can provide a strong base for room calibrations as well.

Figure 5:
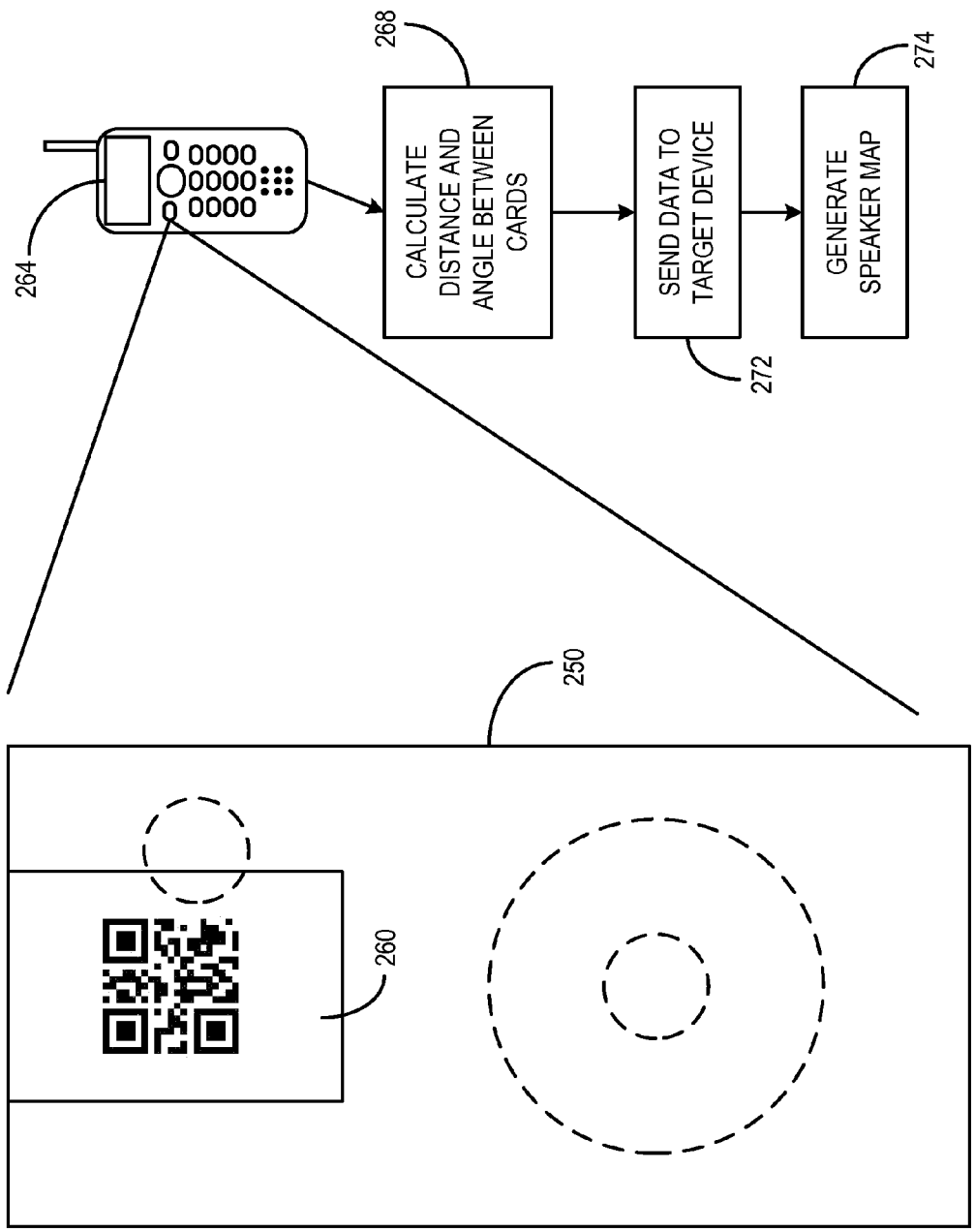
FIG. 5 is an example depicting a method for use of a camera device to define a loudspeaker layout in a manner consistent with certain embodiments of the present invention.

In one implementation, an Android™ operating system (or other operating system) compatible application residing on a multiple function cellular telephone having an integral camera can be used to accomplish this. The user can print out cards and tape them to their loudspeakers, or an indicia can be factory supplied as part of the loudspeaker manufacture (e.g., as a removable indicia or as an indicia that is only visible under certain lighting conditions). These cards contain specific information about the speakers, such as size, impedance, frequency response, efficiency, radiation pattern, etc. This is depicted in FIG. 5 where the loudspeaker 250 is labeled with a paper or card 260 containing indicia such as a QR code. An additional card can be placed at the anchor point, which will be the user's ideal seating position or all of the photographs can be taken from the anchor point. The Android application uses the device's camera 264 and asks the user to focus the on the anchor point. The user then moves the camera to each loudspeaker, focusing on the each card label as he goes. The application detects the indicia on the cards and then calculates their distance and angle from the previous card and/or the listening point at 268. The distance calculation can involve pixel detection as well as using the device's built-in compass (accelerometers) or GPS and autofocus data. Once all the information is gathered, the application can send the data at 272 through the network to any requesting target device where the speaker map can be generated at 274.

This method provides flexibility and simplicity in user input as well as ease of use. Just like the input from user application, this method of measurement allows for additional information to be obtained. Users can additionally print out additional cards for windows, furniture, and walls and use the present technique. However, even though this drastically improves the ease of use, the user may still wish to refine the data if the mapping of the room is to be optimized. This can be done, for example, by augmenting the data captured by the camera with the GUI technique described above.

Referring now to FIG. 6, a flow chart 300 depicts an example of the process just described starting at 304. At 308 visual codes are attached to the audio system's loudspeakers once they are placed in position in the room. These visual codes can be downloaded and printed from the Internet, or may be provided as a part of the manufacture of the loudspeaker or may accompany a component of the audio system in pre-printed form (e.g., as stickers). The user then starts an application on a camera phone or similar camera device at 312. A photograph is then taken of each loudspeaker at 316— for example, from the listening position. However, by splicing images and/or using GPS location and/or compass information photographs can theoretically be taken from any position in the room. The application reads the visual codes from all of the images at 320 and determines at 324 the speaker type from the visual code at 328 or from an estimate of size from the camera's pixel data and range-finding at 332. In other implementations, the user can input the data into the camera or audio system for the particular speaker model or other mechanisms can be provided to characterize each loudspeaker.

At 336 either the application or the target audio system (or a computer attached thereto) computes direction, distance and other position information for the speaker arrangement in either two dimensional or three dimensional space at 336 using GPS data 340, camera pixel data 344 and camera autofocus or orientation (compass or accelerometer) information 348 or a combination thereof. This loudspeaker configuration information is then output to the audio system as previously described at 352 and the process ends at 356.

Figures 7, 14:
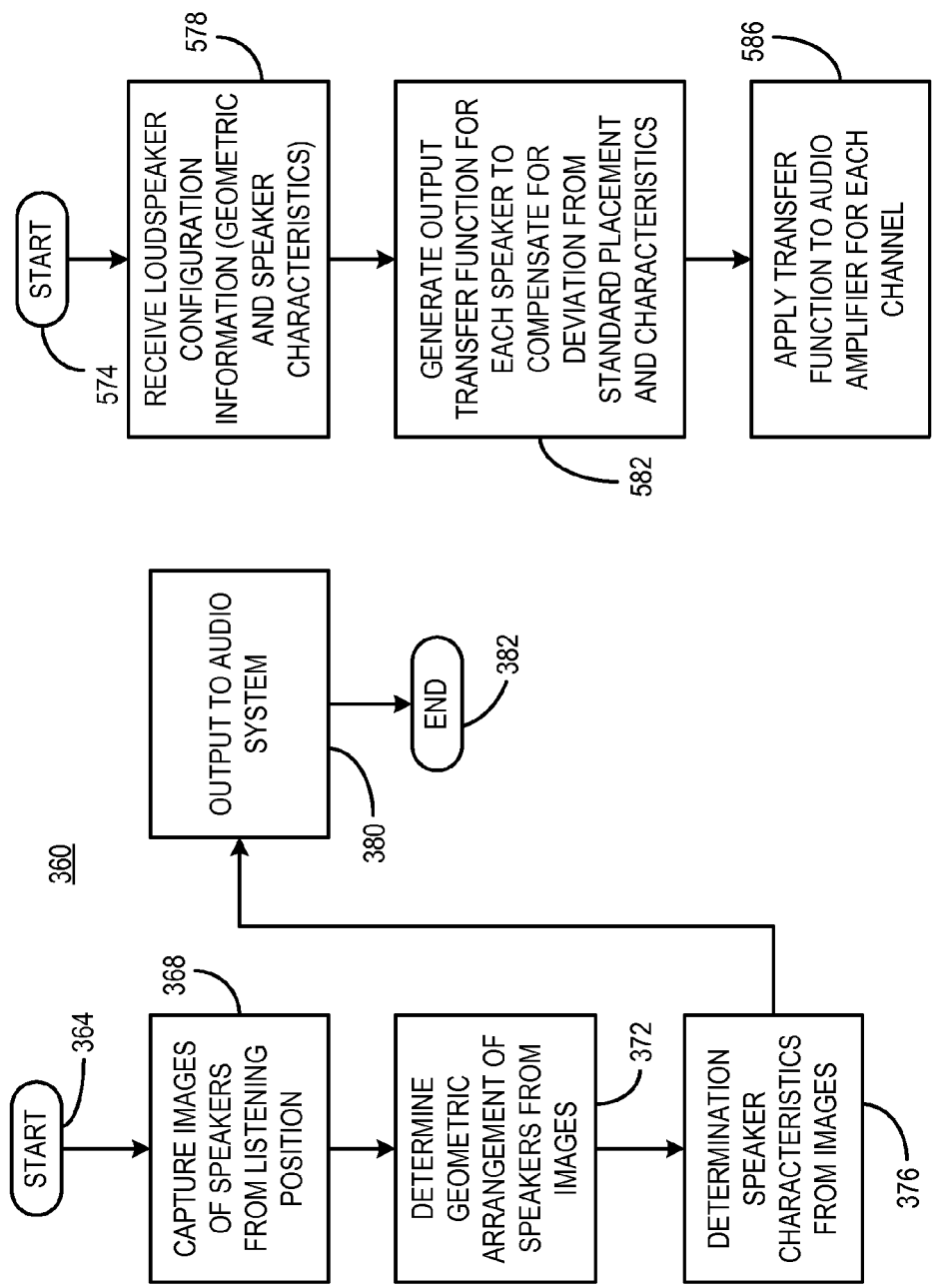
FIG. 7 is another example flow chart of a process for using a camera device to define a loudspeaker layout in a manner consistent with certain embodiments of the present invention.
FIG. 14 is an example flow chart depicting generation and application of a transfer function for loudspeaker mapping used in a manner consistent with certain embodiments of the present invention.

To generalize, in one implementation 360 as depicted in FIG. 7, the process starts at 364 after which images are captured of each loudspeaker, for example from the listening position at 368. The geometric arrangement of the loudspeakers can then be determined at 372 from the images as can the loudspeaker characteristics (at least in part) at 376. This data are then output to the audio system at 380 and the process ends at 382. Many variations will occur to those skilled in the art upon consideration of the present teachings.

Figure 8:
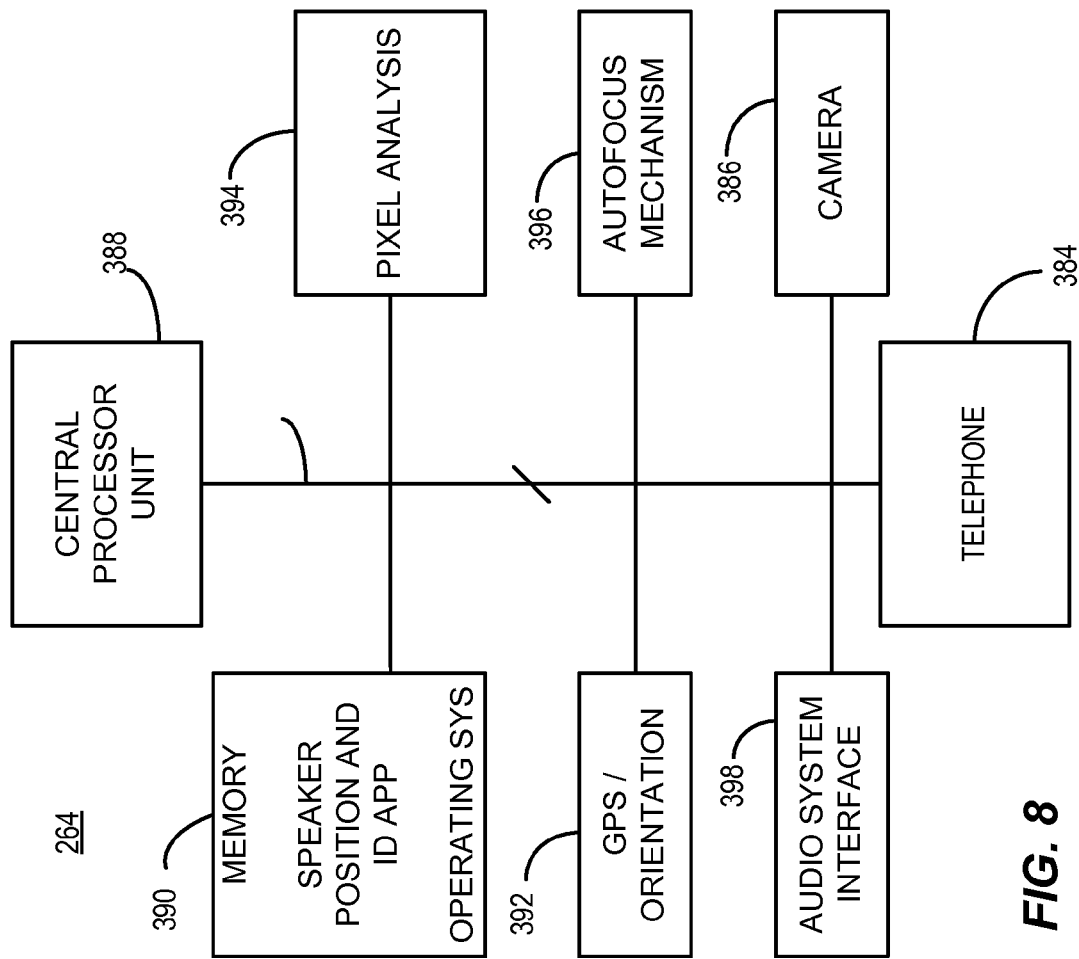
FIG. 8 is an example block diagram of a camera device consistent with certain embodiments of the present invention.

FIG. 8 depicts a camera device such as a cellular telephone that can be utilized as described above. The camera device may have cellular telephone capabilities via telephone circuitry and incorporates a digital camera 386 operating under control of a central processor 388. Central processor 388 uses a memory 390 that incorporates an operating system such as the Android™ operating system and a speaker position and identification application (app). Any suitable computer readable storage such as a flash memory can be used for memory 390. The camera device may also include global positioning system (GPS) capabilities and orientation circuitry 392 such as three dimensional accelerometer devices as is common with cellular telephones and programming for pixel analysis 394 to determine relative sizes, read bar codes or QR codes or other suitable codes used to encode loudspeakers or listening positions. The camera's autofocus mechanism 396 also incorporates ranging technology whose output can be used to help isolate distances from the camera to the target. Additionally, the telephone system can incorporate an audio system interface 398 to directly plug into the audio amplifier (e.g., a universal serial bus (USB) compatible output) or may communicate with the audio amplifier via an Internet or BlueTooth™ link connection. The pixel analysis, autofocus, GPS and orientation information can be used cooperatively in any combination or alone to provide assistance in determining the speaker layout without limitation.

Thus, a method consistent with the above teachings can involve, at a listening position, capturing a plurality of photographic images at 368 with a camera of a corresponding plurality of loudspeakers forming part of an audio system; determining from the plurality of captured images, a geometric configuration at 372 representing a positioning of the plurality of loudspeakers connected to the audio system; and outputting the geometric configuration of the plurality of loudspeakers to the audio system at 380.

In certain implementations, the method can further involves determining at least one loudspeaker characteristic from the images. In certain implementations, the loudspeaker characteristic can include a category of physical size of the loudspeaker. In certain implementations, the loudspeaker characteristic can include a loudspeaker speaker model. In certain implementations, the loudspeaker characteristic is encoded in a visual indicator affixed to the loudspeaker and captured in the photographic image. In certain implementations, the geometric configuration of each of the plurality of loudspeakers is characterized by a position in two dimensional or three-dimensional space. In certain implementations, data associated with each of the loudspeakers is encoded by a visual indicator affixed to each loudspeaker. In certain implementations, the visual indicator is a two dimensional bar code or the like such as a QR code. In certain implementations, the visual indicators can include information identifying an estimate of a frequency response characteristic of the loudspeakers or a loudspeaker size indicator.

In certain implementations, the geometric configuration is deduced at least in part from a distance measurement generated by the camera's autofocus mechanism or in part from global positioning system information determined by the camera or in part from directional information generated by the camera or in part from size estimates generated by the camera's pixel information.

The camera can form a part of a telephone, and the method can be carried out using an application (an app) running on a programmed processor forming a part of the telephone.

Another method consistent with the above discussion involves at a listening position, capturing a plurality of photographic images with a camera of a corresponding plurality of loudspeakers forming part of an audio system; determining from the plurality of captured images, a geometric configuration representing a positioning in three-dimensional space of the plurality of loudspeakers connected to the audio system; determining at least one loudspeaker characteristic from the images, where data associated with each of the plurality of loudspeakers is encoded by with a quick response code serving as a visual indicator affixed to each of the plurality of loudspeakers; and outputting the geometric configuration of the plurality of loudspeakers to the audio system.

In certain implementations, the loudspeaker characteristic comprises at least one of a category of physical size of the loudspeaker and a loudspeaker speaker model. In certain implementations, the geometric configuration is deduced at least in part from at least one of a distance measurement generated by the camera's autofocus mechanism, global positioning system information determined by the camera, directional information generated by the camera, and size estimates generated by the camera's pixel information.

Another method consistent with the above teachings involves at a listening position, capturing a plurality of photographic images with a camera of a corresponding plurality of loudspeakers forming part of an audio system; determining from the plurality of captured images, a geometric configuration representing a positioning in three-dimensional space of the plurality of loudspeakers connected to the audio system; where the geometric configuration is deduced at least in part from at least one of a distance measurement generated by the camera's autofocus mechanism, global positioning system information determined by the camera, directional information generated by the camera, and size estimates generated by the camera's pixel information; determining at least one loudspeaker characteristic from the images, where data associated with each of the plurality of loudspeakers is encoded with a quick response code serving as a visual indicator affixed to each of the plurality of loudspeakers; where the at least one loudspeaker characteristic comprises at least one of a category of physical size of the loudspeaker and a loudspeaker speaker model; and outputting the geometric configuration of the plurality of loudspeakers to the audio system.

A camera device consistent with the above discussion has a processor. The camera is adapted to capture an image of a loudspeaker. The processor is programmed to: determine from a plurality of captured images of loudspeakers, a geometric configuration representing a positioning of the plurality of loudspeakers forming part of an audio system; and output the geometric configuration of the plurality of loudspeakers to the audio system.

In certain implementations, the processor is further programmed to determine at least one loudspeaker characteristic from the images. In certain implementations, at least one loudspeaker characteristic includes a category of physical size of the loudspeaker or a loudspeaker speaker model. The loudspeaker characteristic can be encoded in a visual indicator affixed to the loudspeaker and captured in the photographic image. The geometric configuration of each of the plurality of loudspeakers can be characterized by a position in two- or three-dimensional space. In certain implementations, data associated with each of the plurality of loudspeakers is encoded with a visual indicator affixed to each loudspeaker such as a two dimensional bar code, e.g. a QR code.

In certain implementations, the visual indicators can include information identifying an estimate of a frequency response characteristic of the loudspeakers. The estimate can be represented, for example, as a loudspeaker size indicator. In certain implementations, the geometric configuration is deduced at least in part from a distance measurement generated by the camera's autofocus mechanism, or deduced at least in part from global positioning system information determined by the camera, or deduced at least in part from directional information generated by the camera, or deduced at least in part from size estimates generated by the camera's pixel information. In certain implementations, the camera forms a part of a telephone, and where the method is carried out using an application running on a programmed processor forming a part of the telephone.

Any of the above processes can be carried out using a tangible computer readable storage medium storing instructions that when carried out on one or more programmed processors forming a part of a camera device. The storage medium can be any suitable storage medium including so-called non-transitory storage media, where "non-transitory" is intended only to distinguish the term over transitory propagating signals.

C. Measurement of Audio Markers

This method uses minimal input from the users since all the calculations are done by a computer application. As a result of its ease of use to the user, this method is the most software intensive and utilizes a reconfiguration of the basic audio system's hardware. The basic concept is to use one or more microphones to listen for audio markers, in the forms of test tones, sent by the speakers. The application calculates the location of the speakers by determining how long the audio marker took to reach the microphone. The number of microphones determine if the application measure distances, or distances and angles. Using a single microphone will result in the distance by using "Time of Flight" calculation. Using multiple microphones in pre-defined arrays can determine distance and angles from the Time Difference of Arrival calculation. Although using multiple microphones simplifies calculations, it increases the overall cost of the product. It also requires the user to interact with the application, positioning and moving the microphone around the room.

In accord with implementations consistent with this embodiment however, the process is radically simplified for the user by use of one or more of the system's loudspeakers as a microphone, thus eliminating the need for one or more separate dedicated microphones. Because speakers and microphones are both transducers and are essentially the same circuitry, a speaker can become a microphone with no harm to the speaker. To be able to accomplish this task, the power amplifier is provided with the ability to switch one or more of the speaker outputs to become a microphone input. In one implementation, one by one, the application turns each speaker into a microphone and the other speakers will send out test tones (either sequentially, or by using a distinct test tone for each speaker). A Time of Flight calculation can be taken by measuring the time it takes for a test tone to reach the loudspeaker operating as a microphone. Moreover, an analysis can be conducted of the received sound to determine not only Time of Flight, but presence of echoes, reverberations, and their relative intensity as a measurement of the presence of obstructions and as an indication of the liveliness of a given room. Hereinafter, when the term "microphone" is used, the term is intended to mean a loudspeaker configured to operate as a microphone. The end result of the application is the distances found for all speakers to each other.

This method eliminates or minimizes the complex user input and may reduce the cost of a product by eliminating the need for an external microphone, but at the expense of the switching circuitry for switching a speaker to a microphone input.

Figure 9:
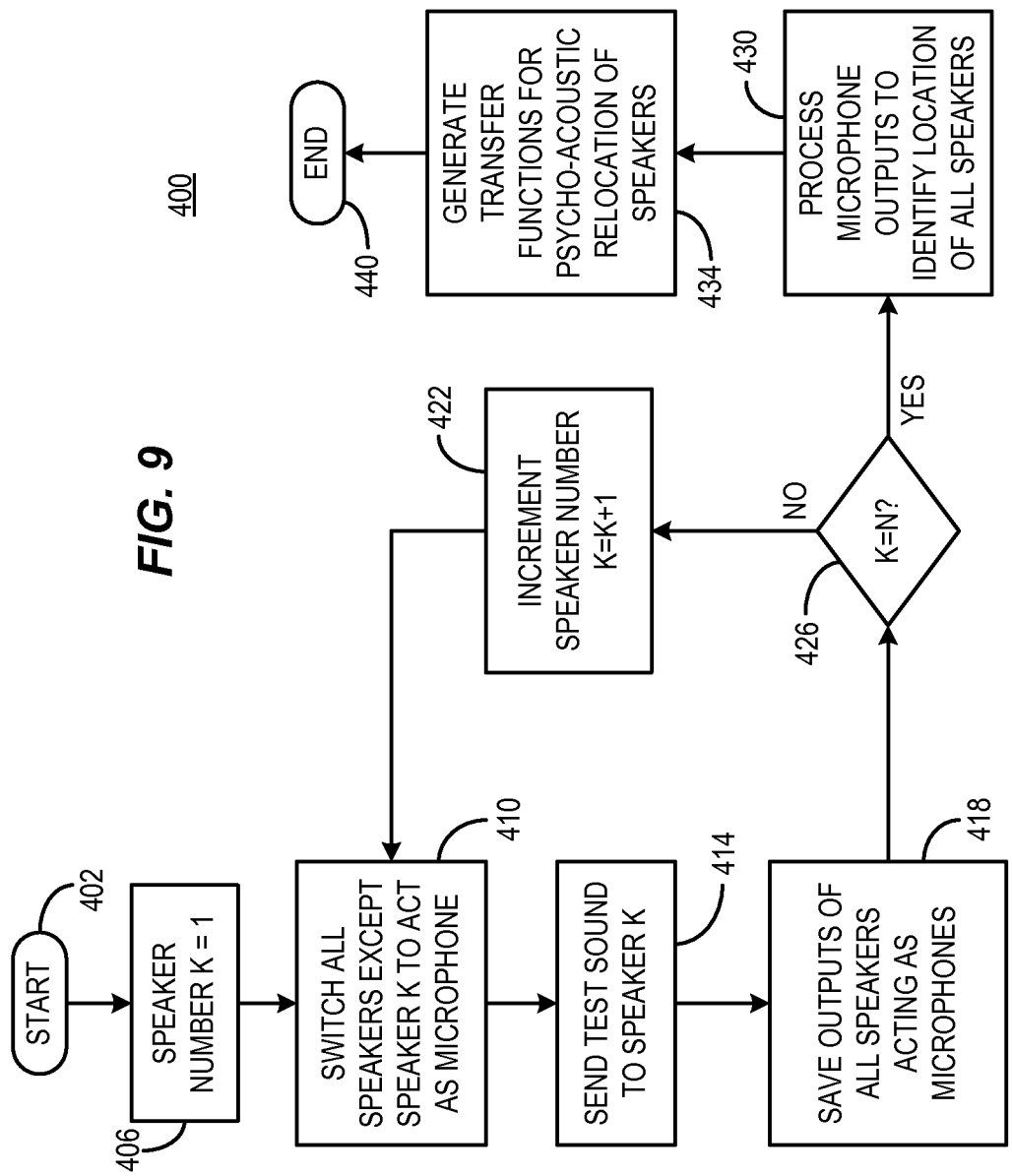
FIG. 9 is an example flow chart of a process using loudspeaker to microphone switching to define a loudspeaker layout in a manner consistent with certain embodiments of the present invention.

An example of this implementation is depicted as process 400 of FIG. 9 starting at 402. At 406, the process initializes by designating a loudspeaker number k as equal to 1 (i.e., pick a first speaker), where the loudspeakers can be numbered according to any desired order. In this example, all loudspeakers except for loudspeaker number k is configured to act as a microphone at 410. A test sound is then sent to loudspeaker k at 414 and this sound is picked up by each of the other loudspeakers configured as microphones at 418 and data regarding the time of flight and possibly amplitude and phase information, echoes, etc. are stored at 418. If the last loudspeaker (n) has not been reached at 426, the value of k is incremented by 1 at 422 and the next loudspeaker k is configured to act as a speaker while the others are configured as microphones at 410. This process iterates until k=n and the last loudspeaker has been reached at 426.

Note that the process can be carried out without knowledge of the actual number of loudspeakers and the value of n can be the maximum number of loudspeaker connections available to the amplifier without regard for whether or not a loudspeaker is connected thereto. The process then proceeds to 430 where the stored data from each iteration are analyzed to identify the location of each loudspeaker. This information can then be used to generate a transfer function at 434 to psycho-acoustically relocate and/or assign the loudspeakers as desired to most accurately reproduce the sources of sound within any constraints imposed by the actual loudspeaker and room configuration. The process ends at 440. Further note that if this process fails to properly locate the actual physical geometric location of a loudspeaker, it will successfully locate an apparent location of the loudspeaker from an acoustic perspective rendering the data potentially of more value than the actual loudspeaker location. That is for example, if a reflective sound is louder than a direct sound due to audio obstructions, the reflected sound may be the one which should be used in modeling the speaker performance in the actual room.

Figure 10:
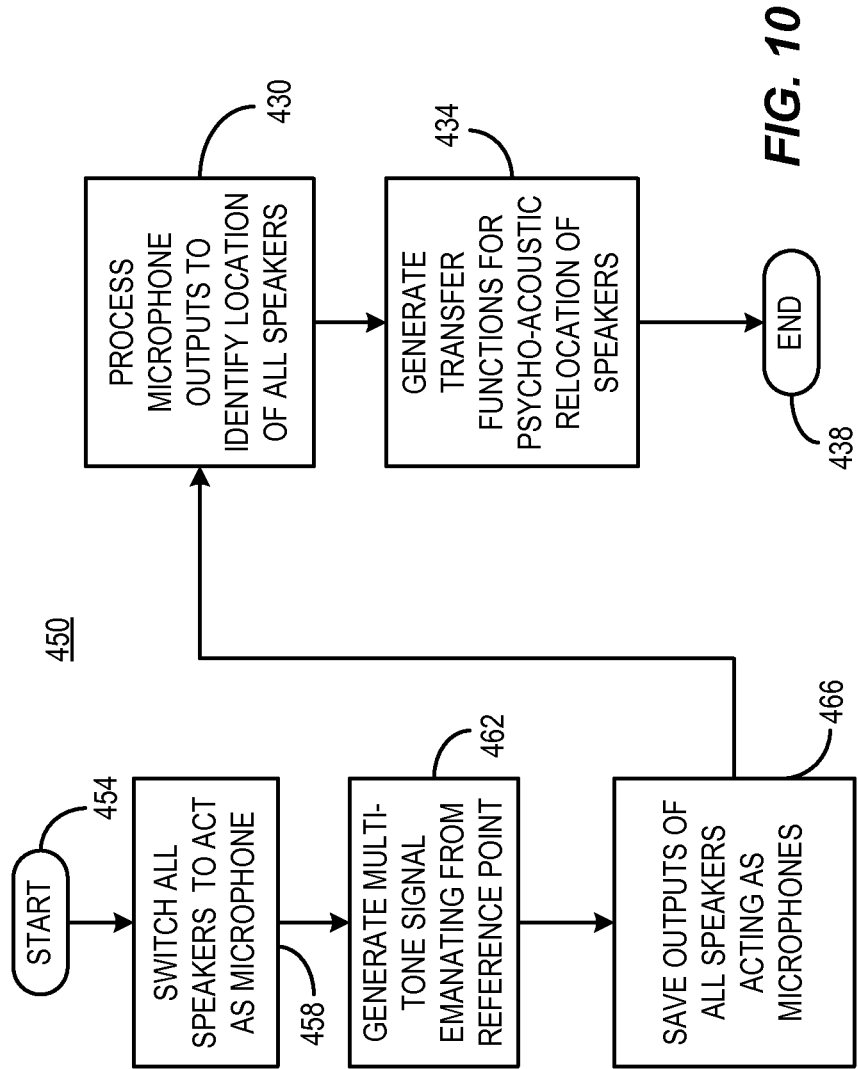
FIG. 10 is another example flow chart of a process using loudspeaker to microphone switching to define a loudspeaker layout in a manner consistent with certain embodiments of the present invention.

An alternative is depicted in FIG. 10 as process 450. In this process starting at 454, all speakers are switched to act as microphones at 458. A multi-tone test signal is then generated from a reference point (e.g., the center channel speaker-in which case this loudspeaker is not in fact switched to act as a microphone) at 462. The output of all speakers acting as microphones is then saved at 466. As before, the process then proceeds to 430 where the stored data are analyzed to identify the location of each loudspeaker. This information can then be used to generate a transfer function at 434 to psycho-acoustically assign and relocate the loudspeakers as desired within any constraints imposed by the actual loudspeaker configuration. The process ends at 438. This characterizes the speaker arrangement, but does not account for the listening zone unless the reference point is made to be the listening zone, or unless an ideal listening zone is used or an actual listening zone is otherwise defined.

Figure 11:
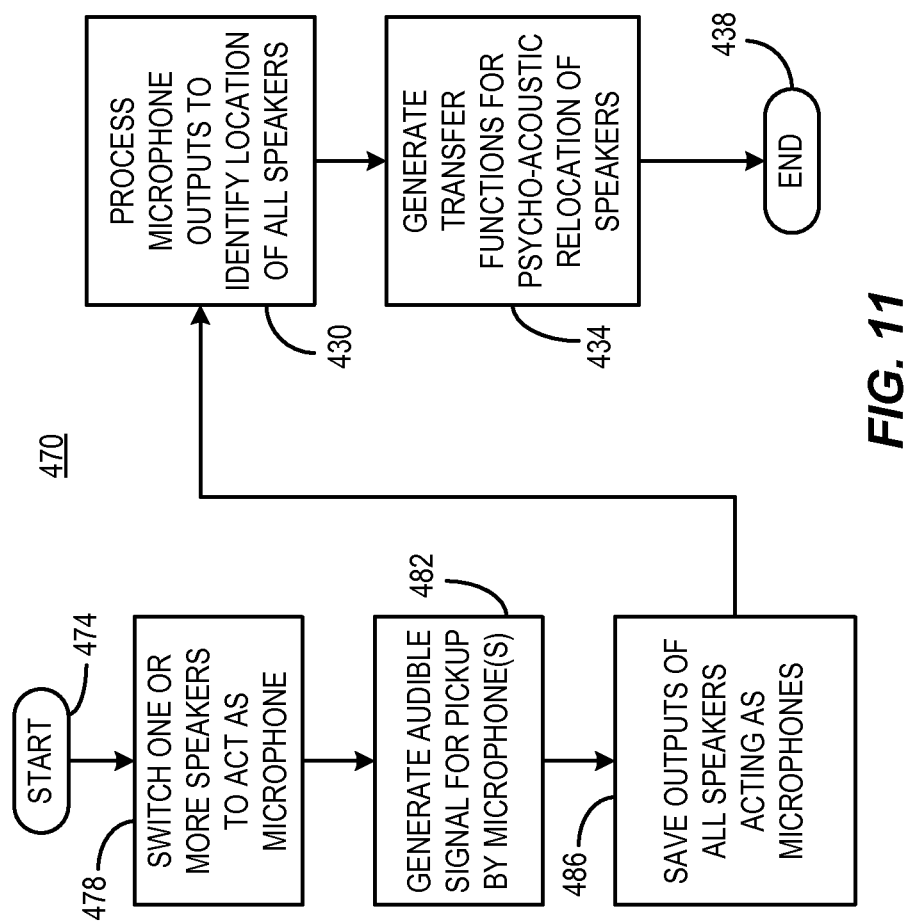
FIG. 11 is another example flow chart of a process using loudspeaker to microphone switching to define a loudspeaker layout in a manner consistent with certain embodiments of the present invention.

Another alternative is depicted in FIG. 11 as process 470. In this process starting at 474, one or more speakers are switched to act as microphones at 478. An audible test signal is then generated for pickup by the microphone(s) at 482. The output of all speakers acting as microphones is then saved at 486. As before, the process then proceeds to 430 where the stored data are analyzed to identify the location of each loudspeaker. This information can then be used to generate a transfer function to psycho-acoustically relocate the loudspeakers at 434 as desired within any constraints imposed by the actual loudspeaker configuration. The process ends at 438. This characterizes the speaker arrangement, but does not account for the listening zone unless the reference point is made to be the listening zone, or unless an ideal listening zone is used or an actual listening zone is otherwise defined.

Figure 12:
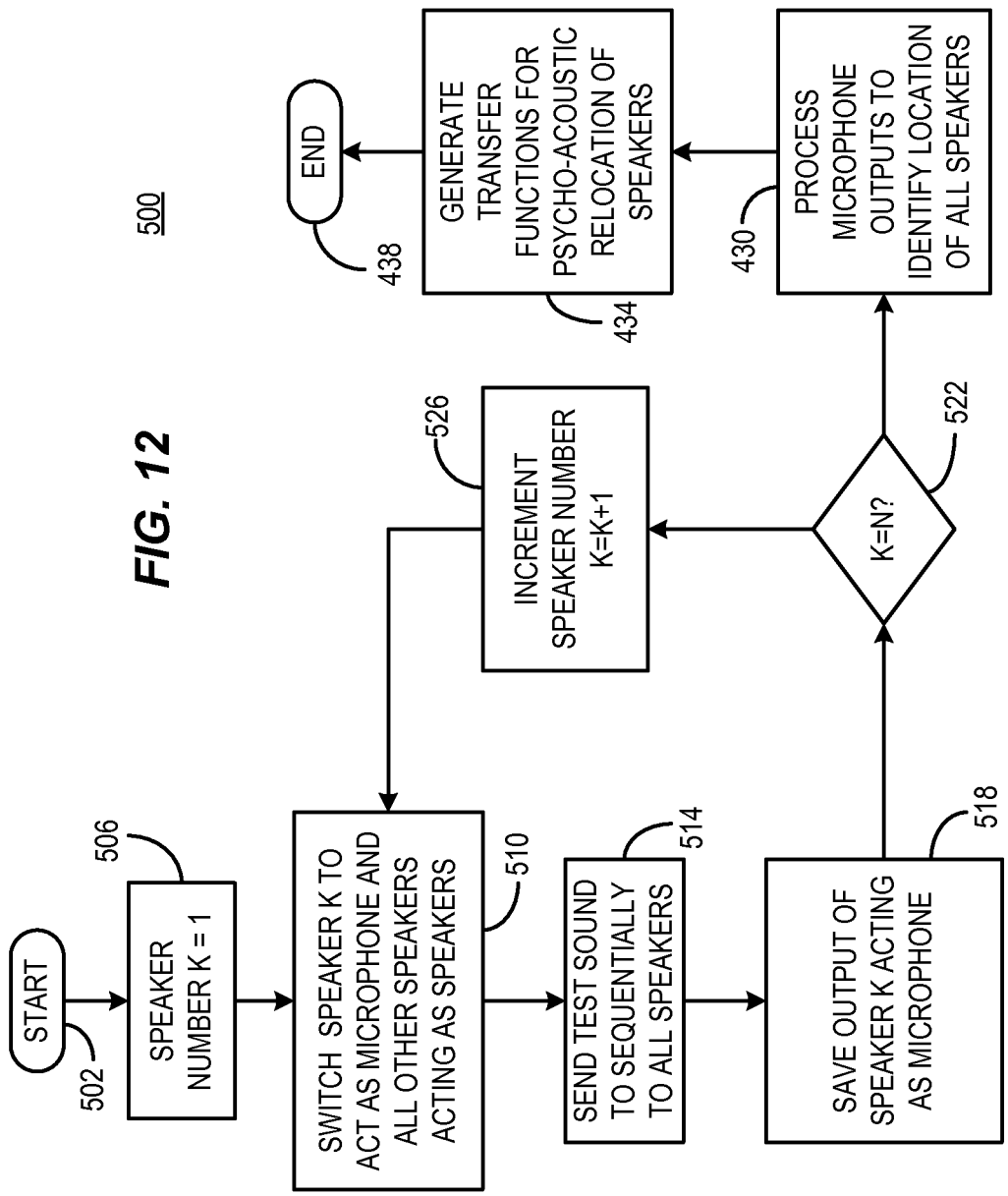
FIG. 12 is another example flow chart of a process using loudspeaker to microphone switching to define a loudspeaker layout in a manner consistent with certain embodiments of the present invention.

Another implementation is depicted as process 500 of FIG. 12 starting at 502. At 506 the loudspeaker number k is initialized to 1 as in a prior example. At 510, loudspeaker k is set to act as a microphone and all other loudspeakers are configured to act as loudspeakers. A test sound (e.g., a tone) is then sent sequentially to each of the loudspeakers (alternatively, they can be sent simultaneously using a distinctive test sound at each speaker) at 514. The outputs of all microphones are then saved at 518 and the value of k is tested to see if the last speaker n has been reached at 522. If not, the loudspeaker number is incremented to k+1 at 526 until k=n at 522.

From 526, the process returns to 510. When the last loudspeaker is reached at 522, control passes to 430. As before, at 430 the stored data are analyzed to identify the location of each loudspeaker. This information can then be used to generate a transfer function to psycho-acoustically assign and/or relocate the loudspeakers at 434 as desired within any constraints imposed by the actual loudspeaker configuration. The process ends at 438. This characterizes the speaker arrangement, but does not account for the listening zone unless the reference point is made to be the listening zone, or unless an ideal listening zone is used or an actual listening zone is otherwise defined.

It will be readily apparent that many variations of this process can be implemented using any or all of the available loudspeakers as either speakers, microphones or both in sequential and parallel processes. Moreover, this technique can be combined with each of the techniques A and B above cooperatively to characterize a particular room and speaker layout.

Figure 13:
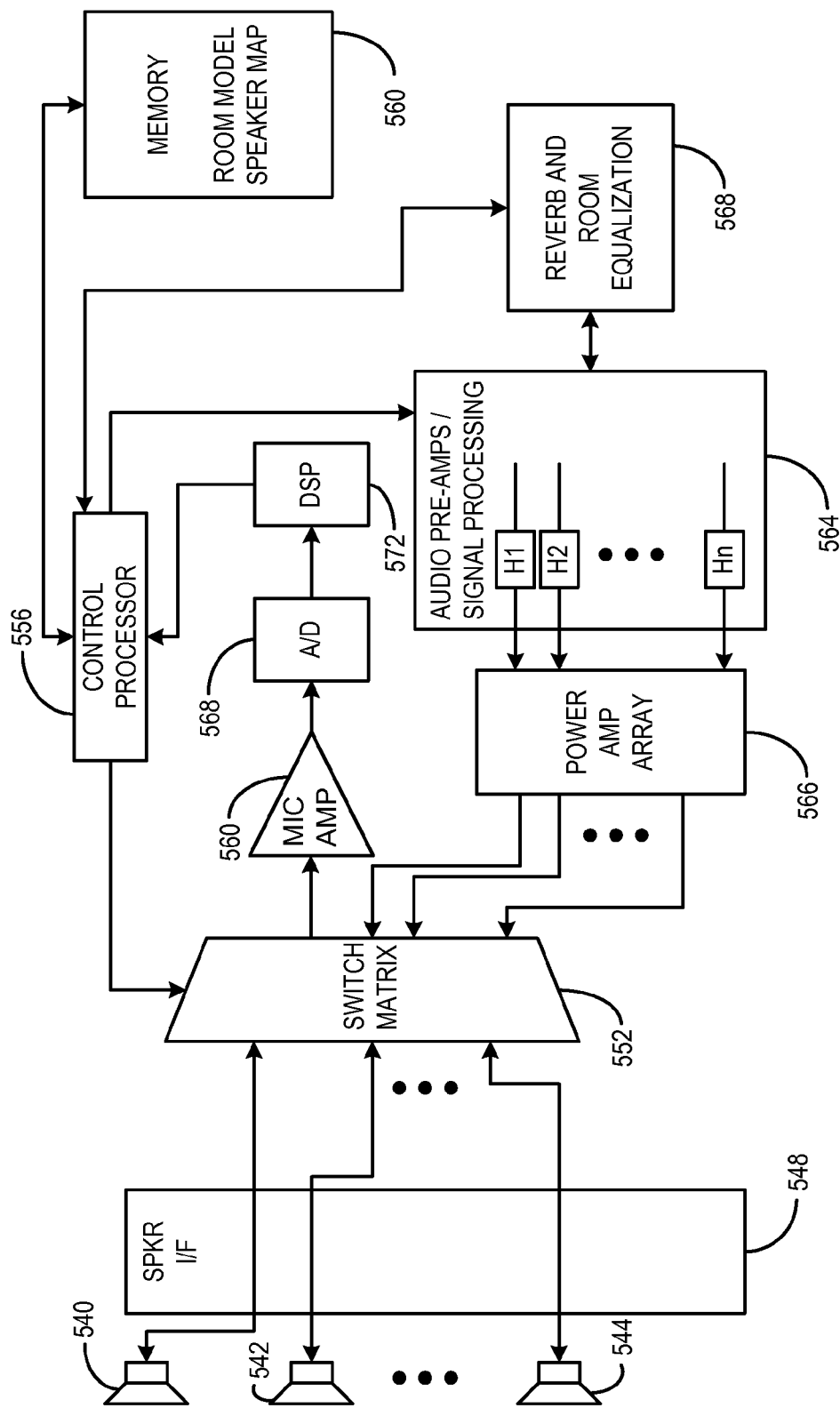
FIG. 13 is an example block diagram of a multi-channel audio amplifier consistent with certain implementations of the present invention.

In any case, an amplifier configuration capable of switching loudspeaker transducers to operate in either a loudspeaker mode or a microphone mode can be devised such as that of FIG. 13. In this amplifier configuration (shown in relevant part), a plurality of essentially any number of loudspeakers 540, 542 through 544 are connected to an interface 548 of speaker terminals that are then wired to a switch matrix 552 that operates under control of one or more programmed control processors 556 to route one or more speakers to either a microphone amplifier 560 (or an array of such amplifiers in the case where more than one speaker is acting as a microphone simultaneously) or to a power amplifier array with one power amplifier per channel (where a subwoofer channel may be considered a channel despite the 0.1 designation commonly used).

When one or more of the loudspeakers 540, 542 through 544 is connected as a microphone thorough microphone preamplifier 560 (or preamplifier array 560), the signal from the microphone is amplified, converted to digital at A/D converter 568 and processed by digital signal processor 572 (which may be a part of processor(s) 556) in order to analyze flight time and possibly echoes, phase and other operational parameters of the system during the test. This information is stored to memory 560 as the test proceeds. The various iterations described previously can be exhausted under control of processor(s) 556 until the test is complete. At this point, the processor(s) 556 can calculate the geometric relationships between the various loudspeakers and deliver appropriate transfer function information that is used to provide digital signal processing at signal processor and audio preamplifiers 564 so that the various channels are adjusted to effect changes in the audio to compensate for room variations and loudspeaker placement. Each channel can be adjusted using transfer functions H1, H2 through Hn to the pre-amplification signal path prior to reaching the power amplifier array 566.

Additionally, by analysis of the room layout, additional processing can be carried out at processor(s) 556 to establish an appropriate level of equalization and reverberation at 568 to be added if desirable to enhance the audio system's performance within the room. Generally a higher amount of absorptive surfaces in the room will produce reduced natural reverberation (room liveliness) and may call for adjustment of equalization to account for sound absorption at various frequencies and additional artificial reverberation effects may be added to liven a "dead" room (one with a large amount of sound absorptive materials). Additionally, the reverb and room reflections can be analyzed, for example in the manner discussed in published U.S. Patent Application No. 20100198426A1 to Kondo, et al. which is hereby incorporated by reference.

Once the room and its furnishings are established, the system can adjust reverb and amplitude to account for the room's features. Also, by knowing more of the room, the system can make suggestions as to how to set up the room for better acoustic performance. This can be accomplished by suggesting the changing of speaker locations, addition of absorbing or diffusing material or making other changes, and can provide the user with the ability to carry out so-called "what if" modifications to the room arrangement to see if it results in improved sound quality.

It is further noted that the arrangement shown in FIG. 13 generally represents the A/V amplifier consistent with any of the embodiments disclosed herein except that if the audio marker measurement method is not used, then there is no need for the switching matrix 552, microphone amplifiers 560, A/D 568 and DSP 572.

In each case above, an objective is to characterize a room and loudspeaker positioning so as to improve the performance of the audio system. Referring to FIG. 14, the overall process 570 can be described starting at 574 after which the loudspeaker configuration information is received which may include geometric layout and room configuration and speaker characteristics at 578. An output is generated at 582 which provides an amplifier system with a transfer function for each loudspeaker in order to compensate for deviation from ideal placement and other characteristics, e.g., of the room. These transfer functions are then applied at 586 when audio is reproduced in order to correct for anomalies in the speaker placement, room furnishings, etc.

Up to this point, the description has assumed the presence of a coordinate system that can be used to characterize a particular audio setup. However, no particular coordinate system has been described. It is therefore appropriate to define a coordinate system in order to utilize the above concepts and carry out the desired calculations which effect trilateralization in a manner similar to that used by the global positioning system to define the actual speaker placement so that loudspeaker assignment and psycho-acoustic principles can be applied in order to define the virtual placement of loudspeakers in a room to achieve a realistic surround sound experience.

Thus, a multi-channel audio amplifier consistent with the above discussion has a plurality of audio amplifiers such as 566 having a plurality of audio amplifier outputs. One or more programmed processors are provided and a loudspeaker interface such as 548 is configured to connect a plurality of loudspeakers to the plurality of audio amplifier outputs. An array of switches such as 552 is configured to switch a connection at the loudspeaker interface between one of the plurality of audio amplifiers and a coupling where the loudspeaker serves as a microphone. The array of switches operating under control of the one or more programmed processors which are also programmed to analyze audio signals received by one or more of the loudspeakers serving as microphones to compute a geometric configuration of a plurality of the loudspeakers when the plurality of loudspeakers are connected to the loudspeaker interface.

In certain implementations, the multi-channel audio amplifier has a signal processor that receives information from the one or more processors to generate a modified audio signal to one or more of the plurality of loudspeakers to change an apparent geometric location for one or more of the plurality of loudspeaker's with relation to others of the plurality of loudspeakers using psycho-acoustic simulation of movement of the one or more loudspeakers. In certain implementations, the array of switches is switched under control of the one or more programmed processors to sequentially change each loudspeaker connection to serve as the microphone, and where each of the remaining loudspeakers is driven with an audio test signal. In certain implementations, the array of switches is switched under control of the one or more programmed processors to sequentially change each loudspeaker to be driven as a loudspeaker with an audio test tone while all remaining loudspeaker connections serve as a microphones. In certain implementations, the geometric configuration of the plurality of loudspeakers is computed using trilateration calculations. In certain implementations, the array of switches is switched under control of the one or more programmed processors to change each loudspeaker connection to serve as the microphone, and where each of the remaining loudspeakers is driven with an audio test signal. In certain implementations, a distinct different audio test signal is used to drive each of the remaining loudspeakers.

In another implementation, a multi-channel audio amplifier has a plurality of audio amplifiers having a plurality of audio amplifier outputs and one or more programmed processors. A loudspeaker interface is configured to connect a plurality of loudspeakers to the plurality of audio amplifier outputs. An array of switches is configured to switch a connection at the loudspeaker interface between one of the plurality of audio amplifiers and a coupling where the loudspeaker serves as a microphone. The array of switches can operate under control of the one or more programmed processors and the one or more processors are programmed to analyze audio signals received by one or more of the loudspeakers serving as microphones to compute a geometric configuration of a plurality of the loudspeakers when the plurality of loudspeakers are connected to the loudspeaker interface by use of trilateration calculations. A signal processor receives information from the one or more processors to generate a modified audio signal to one or more of the plurality of loudspeakers to change an apparent geometric location for one or more of the plurality of loudspeaker's with relation to others of the plurality of loudspeakers using psycho-acoustic simulation of movement of the one or more loudspeakers.

In certain implementations, the array of switches is switched under control of the one or more programmed processors to sequentially change each loudspeaker connection to serve as the microphone, and where each of the remaining loudspeakers is driven with an audio test signal. In certain implementations, the array of switches is switched under control of the one or more programmed processors to sequentially change each loudspeaker to be driven as a loudspeaker with an audio test tone while all remaining loudspeaker connections serve as a microphones. In certain implementations, the array of switches is switched under control of the one or more programmed processors to change each loudspeaker connection to serve as the microphone, and where each of the remaining loudspeakers is driven with an audio test signal. In certain implementations, a distinct different audio test signal is used to drive each of the remaining loudspeakers.

A method consistent with certain implementations involves switching one or more loudspeakers of a plurality of loudspeakers to behave as one or more microphones while one or more remaining loudspeakers of the plurality of loudspeakers behave as speakers; generating an audible signal; saving outputs of the one or more loudspeakers acting as microphones; processing the microphone outputs to identify geometric locations of the one or more loudspeakers; and generating a filter transfer function for the one or more of loudspeakers to psycho-acoustically relocate one or more of the loudspeakers from the identified geometric locations when the one or more loudspeakers are used as loudspeakers.

In certain implementations, the audible signal drives one or more of the plurality of loudspeakers that are not switched to behave as one or more microphones. In certain implementations, the geometric location of the one or more loudspeakers is computed using trilateration calculations. In certain implementations, the switching is carried out using an array of switches that are switched under control of one or more programmed processors to sequentially change each loudspeaker to be driven as a loudspeaker with an audio test tone while all remaining loudspeaker connections serve as a microphones. In certain implementations, the switching is carried out using an array of switches that are switched under control of one or more programmed processors to change each loudspeaker connection to serve as the microphone, and where each of the remaining loudspeakers is driven with an audio test signal. In certain implementations, a distinct different audio test signal is used to drive each of the remaining loudspeakers.

Any of the above processes can be carried out using a tangible computer readable storage medium storing instructions that when carried out on one or more programmed processors forming a part of a camera device. The storage medium can be any suitable storage medium including so-called non-transitory storage media, where "non-transitory" is intended only to distinguish the term over transitory propagating signals.

Defining a Coordinate System

In the previous sections methods were described to determine speaker distances. This information is useful for basic task such as level balance and phase adjusting. However for a truly calibrated room, actual spatial position is preferable. Because of the way a human localizes sound, a speaker that is placed too high, too low, or too far can sound different or "off". Using actual positions of the speakers will allow applications to generate corrections to the audio signals to more precisely adjust for differences from an ideal loudspeaker arrangement. By using the distances of each speaker to each other speaker and a listening point, their relative 3-dimensional position from each other can be determined and defined in a Speaker Map. Depending on the type of distances provided, either direct distance or distance and angle, a coordinate system can be created using a suitable algorithm.

Figure 15:
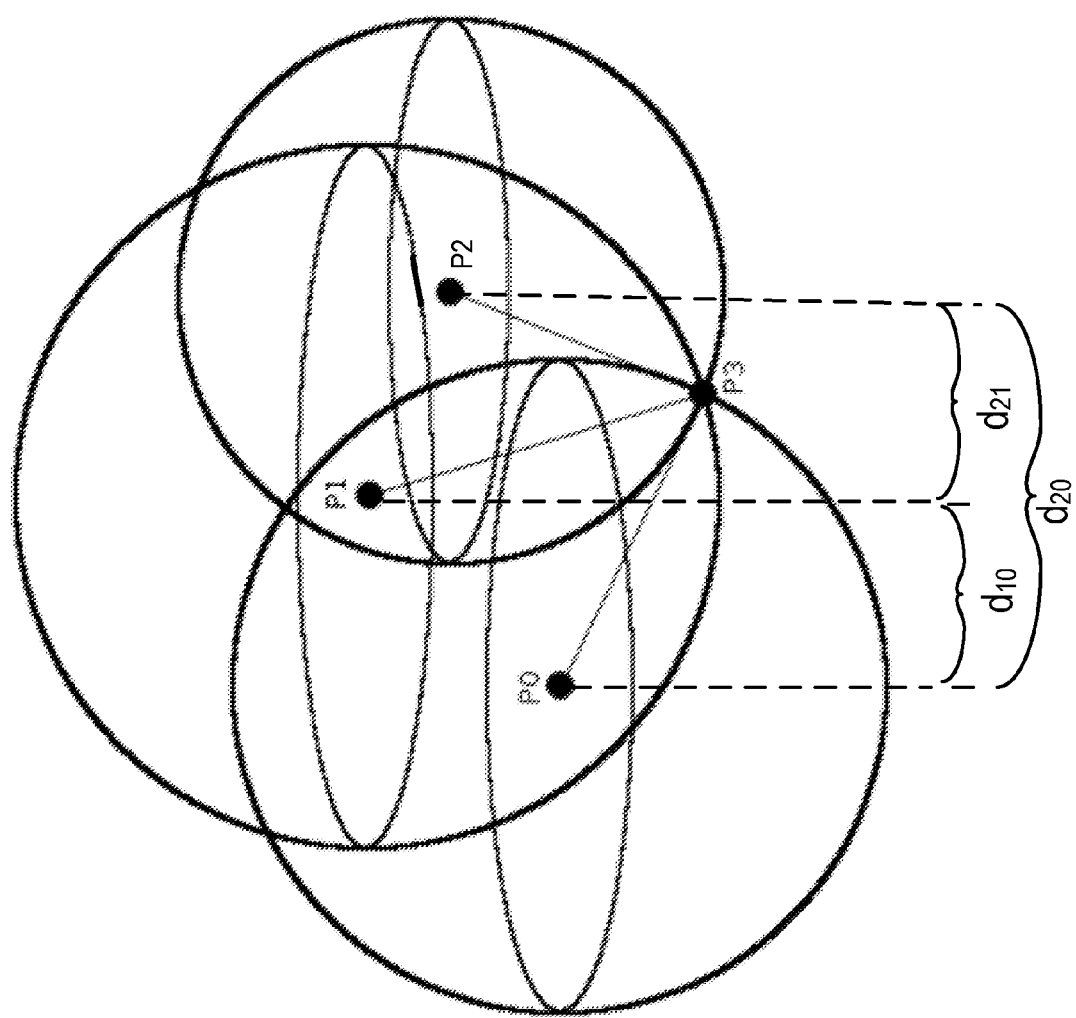
FIG. 15 is an example of a coordinate system for loudspeaker mapping used in a manner consistent with certain embodiments of the present invention.
Figure 16:
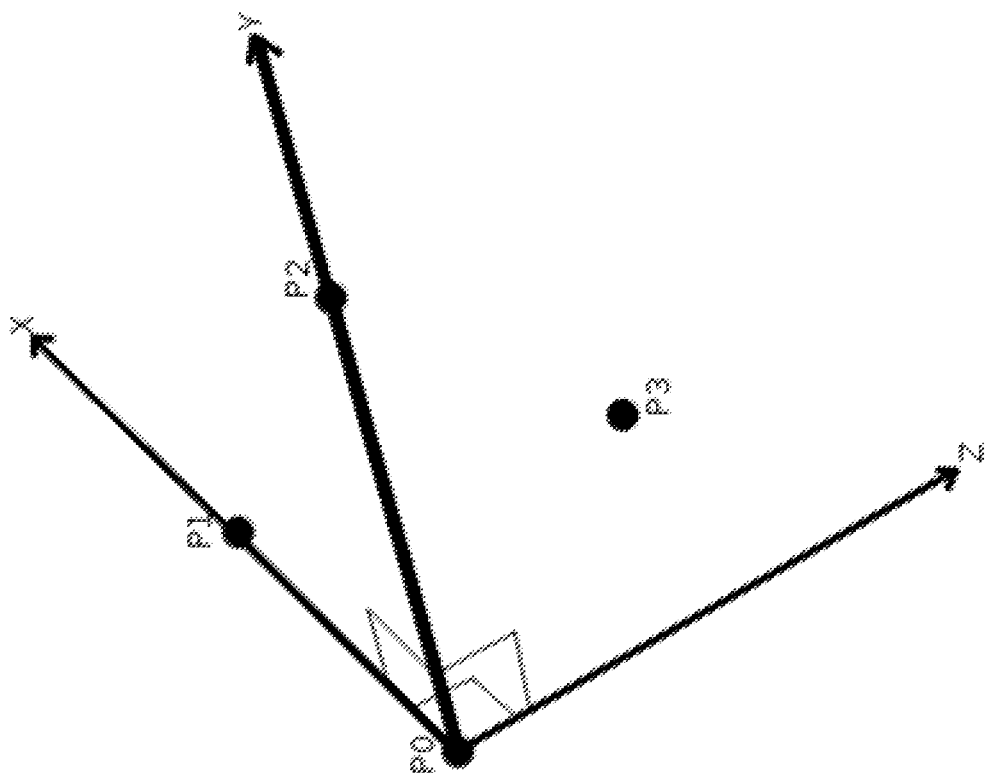
FIG. 16 is a further example illustrating a speaker map coordinate system consistent with certain embodiments of the present invention.

In an example system, one can use three spheres centered at the front speaker positions with each radius of each sphere defined to be equal to its distance to the right side surround speaker. This is depicted in unsealed FIGS. 15 and 16. For purposes of this coordinate system, the algorithm is based upon trigonometry using the above constraints. The algorithm builds the 3-dimensional coordinates by building on standard triangle principles and rules. The speaker map is based on a 3-dimensional Cartesian coordinate system where each point represents a speaker. The units in the system are a scale of the actual distances to the speaker.

A. Mathematical Derivation and Algorithm

Given only the distances between points first define each point within a 3-dimensional Cartesian coordinate system. Starting with a point $P_0$, consider it the origin of 3-dimensional space. So P0 is at point (0,0,0), that is, x=0, y=0 and z=0. Knowing the distance $d_{10}$ to another point $P_1$ from $P_0$ that segment can be defined to be along the x-axis of this space. So $P_1$ is at $(d_{10}, 0, 0)$. Now with a third point $P_2$ and its respective distances to $d_{20}$ to $P_0$ at the origin and $d_{21}$ to $P_1$ along the x-axis define the xy-plane in this space. So $P_2$ is at $(x_2, y_2, 0)$. The x and y values can be solved for by using the equation of a circle $x^2+y^2=r^2$, where r is the radius and is equal to the distance between the given points. Distances $d_{10}$, $d_{20}$ and $d_{21}$ are depicted on FIG. 15 for convenience, and the other points as derived below will be clear in definition by extending the numbering system for the distances. Therefore the equation of the circle from $P_0$ to $P_2$ is $x_2^2+y_2^2=d_{20}^2$ and the equation of the circle from $P_1$ to $P_2$ is $(x_2-d_{10})^2+y_2^2=d_{21}^2$. Now solving for the two unknowns in the two equations gives the results:

$$x_2=(d_{20}^2+d_{10}^2-d_{21}^2)/2*d_{10}$$

$$y_2=((d_{20}+d_{10}-d_{21})(-d_{20}+d_{10}-d_{21})(d_{20}-d_{10}+d_{21})(d_{20}+d_{10}+d_{21}))^{1/2}/2*d_{10}$$

Now a fourth point $P_3$ with known distances to the first 3 points $(d_{30}\ d_{31}\ d_{32})$ will define the 3 dimensional Cartesian coordinate system. Using the equation of a sphere $x^2+y^2+z^2=r^2$ and simultaneously solving for $P_3$'s position yields:

$$x_3=(d_{30}^2-d_{31}^2+d_{10}^2)/2*d_{10}$$

$$y_3=(d_{30}^2-d_{32}^2+x_2^2+y_2^2)/2*y_2-x_2/y_2*x_3$$

$$z_3=(d_{30}^2-x_3^2-y_3^2)^{1/2}$$

Note: since $y_2$ and $z_3$ are square roots there are two possible answers so by convention the positive value can be selected as the correct solution.

With the coordinate system described by the first four points all other points $P_{4\ldots n}$ can reuse the equations used for $P_3$ with the associated distances to points $P_0$ $P_1$ and $P_2$.

Determination of Proper Channel Mixing for Each Speaker

A Speaker Map as described above provides a coordinate system that can be used to represent the locations of all loudspeakers within a room in three dimensions. At minimum the coordinates are signed distances to three mutually perpendicular planes. The Anchor Point in a Speaker Map is also called the origin, or the fixed point of reference. Beside speaker locations, the type of speakers and their radiation pattern also influences the Spatial acoustic performance of the system.

As previously noted, high quality reproduction of sound depends as much on the environment as the equipment. Degradation caused by a glass walled room with misplaced loudspeakers for example can negatively affect the sound quality of the room and cause problems in accurate high fidelity audio reproduction including the localization of the recorded sounds. The more information the reproduction system knows about the environment the better it can ameliorate its deficiencies. In particular where each speaker is located has a significant impact on how accurate sounds are perceived spatially relative to where they were intended when encoded. Although a common setting in modern audio-video receivers is individual speaker volume and delay values this is not sufficient for knowing each speaker's three-dimensional location. A Speaker Map as described above is useful in defining the environment so that deficiencies in loudspeaker layout and room furnishings can be reduced.

Using a Speaker Map such as that defined above, a process is defined that mixes audio channels to adjust for spacing and relative position of the speakers in a room. This process allows the user to perceive the sound as if the loudspeakers were more precisely positioned for correct sound placement in a room. This is accomplished by using loudspeaker selection and psycho-acoustic phenomenon to "move" the perceived source of a sound so as to create a virtual loudspeaker placement.

Currently known home audio sound systems do not account for the position of speakers in a room, but only adjust the sound level to provide a balance sound environment. Combined with sound level, phase and delay adjustments implemented within transfer functions in the audio amplifier, the process described herein provides a more realistic sound environment that is more ideal in a home theater setting despite improper loudspeaker placement and impediments, absorptions and reflections caused by room furnishings and materials. A sound that passes through multiple speaker channels can now be mixed for a seamless, balanced transition between each channel.

If a format that uses raw audio signals is used instead of signals representing sounds processed by a codec such as a 3rd party codec (e.g., DTC, Dolby, etc.), this ability to precisely place a sound in a specific location of a room also allows the process to bypass 3rd party audio post-processing. By interpreting the raw sound files and its metadata, this process can mix the appropriate channels to replicate the sound's intended position. Reproducing a sound's intended position can be advantageous for video gaming as well as home theaters environments and other applications. Using these processes new features can be added to home audio systems and generate a unique advantage of accurate sound placement while avoiding licensing costs for 3rd party audio codecs It is noted that during this discussion, at times it is convenient to use the term "sound" to actually mean a signal that is ultimately (after processing) reproduced at a loudspeaker to reproduce an actual sound. This use of terminology is not believed to contribute to any confusion but simplifies the description.

Figure 17:
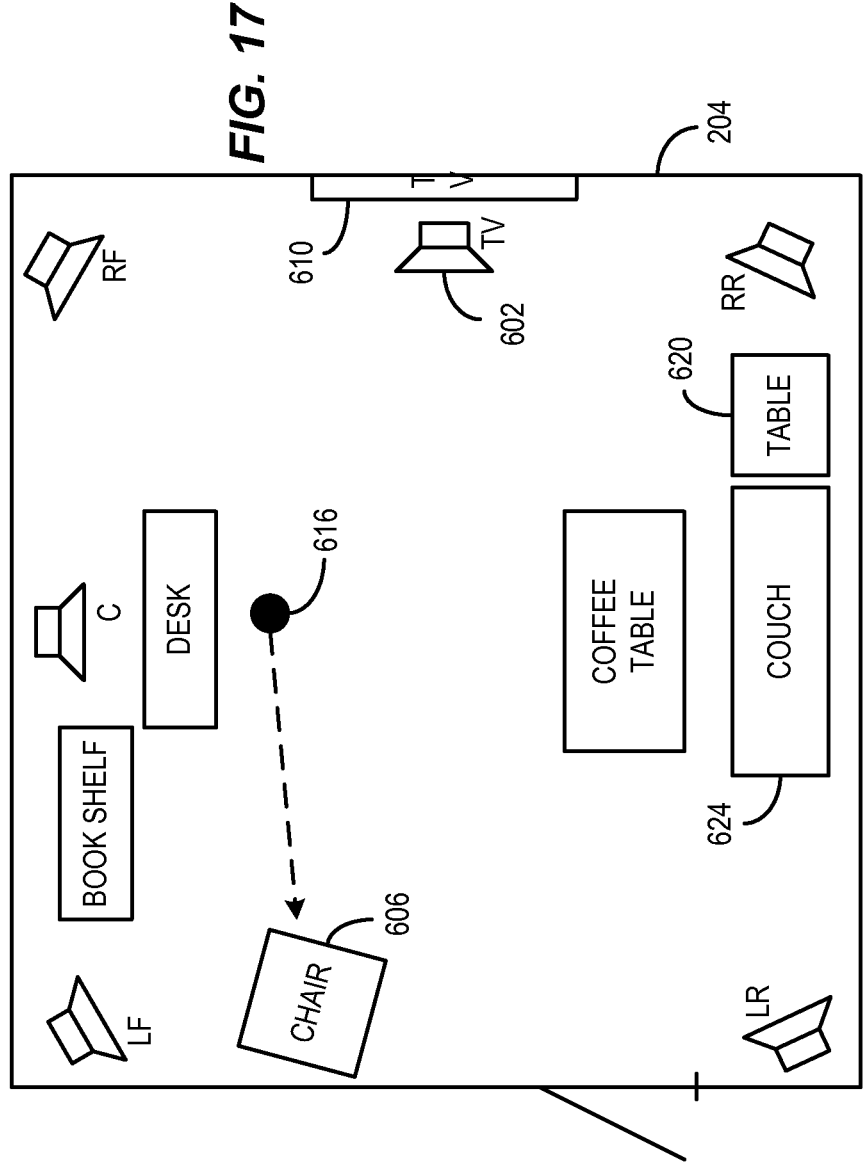
FIG. 17 is an example room layout of an audio system consistent with certain embodiments of the present invention.

As has been noted, in a home theater environment, placement of the loudspeakers is often if not usually sub-optimal. Depending on the number of loudspeakers in a room, there are different recommended layouts. The common accepted 5.1 layout for the five main loudspeakers as called out in ITU 5.1 as shown in FIG. 1 is considered optimal by many and is often used by the recording engineer to manipulate geometric placement of the sounds. However due to room layouts, sometime if not usually it is not possible to place speakers in the ideal position as previously shown in FIG. 2. A room may also have furniture, windows, or doors overlapping with the speaker's ideal position. This is depicted in FIG. 17 where the room layout is similar to that shown in the GUI window of FIG. 4. Most AV receivers provide a room calibration that will attempt to compensate for the odd layout of a room. While some processes are more advance then others, most common room calibrations simply adjust channel level to ensure balance loudness.

In FIG. 17, room 204 can be seen to have some interesting challenges (that will be considered later) to proper loudspeaker placement. When the user is seated at the desk (e.g., for playing a computer game), the main loudspeakers (C, LF, RF, LR and RR) are somewhat misplaced both in distance and angle from that of the ideal of FIG. 1. Additionally, a TV loudspeaker 602 is present. It can be readily envisioned that if the user assumed a listening position seated in chair 606 to view the television 610, the C channel loudspeaker and the other loudspeakers are now drastically out of proper arrangement, adversely affecting how a surround effect will be perceived. However, while viewing the TV 610, a more proper arrangement is can be realized if the TV loudspeaker 602 is used as the center channel, the RF channel loudspeaker is used as LF, the RR channel loudspeaker is used as RF, the LR channel loudspeaker is used as the RR and the LF channel loudspeaker is used as the RR channel.

In either case, either the C channel loudspeaker or the TV channel loudspeaker is redundant to a true five channel surround system. However, in accord with implementations consistent with the present embodiments, these loudspeakers can be used to further enhance the listening experience by their use as additional channels that can be mapped so that the system is actually a six main channel system. Similarly, a seventh speaker could be added if available and that speaker can be used in the speaker map to further enhance the surround effect. Such arrangements are possible without limitation beyond the limitations of number of channels that an amplifier has available. For example, in the original gaming position of the listening position 616, the TV loudspeaker more closely approximates an ideal location (from an angular point of view than the RR channel loudspeaker and could be utilized to enhance that speaker position. The RR channel loudspeaker can then be utilized to enhance the perception of sounds emanating from more rear locations. Other challenges are also presented by the present room layout such as the obstruction created by the RR loudspeaker by the coffee table 620 and other furniture. Additionally, the couch 624, if cloth, reduces sound reflections from the lower side of the room since the cloth may be more absorptive than other more reflective surfaces.

Hence, the present process takes room calibration a step beyond mere adjustment of loudness levels for balancing loudspeakers. When a source input is received, the present process determines the best method to output the source taking into account the room setup. Using a Speaker Map such as the example provided above, the process chooses between three different methods to output the source. Since the output is dependent on the numbers of speakers in the Speaker Map and signal processing is used to position sources of sound, the process is no longer bounded to the predetermined channels of the source input. For instance a 5.1 channel Source Input can be down-mixed to a 2 channel layout or up-mixed to an 8.1 loudspeaker layout by creation of "virtual loudspeakers" as combinations of loudspeakers. A goal of the process is to handle an arbitrary number of speakers in any configuration while still achieving accurate sound placement.

For purposes of this example, the example room is built with little reverberation and has identical Omni-directional speakers. This simplicity allows the example to focus on the core functions applied by the process. In a real world environment, there will be additional adjustments to compensate for the environment and speakers. These adjustments, although potentially significant, will be ignored for sake of simplicity in explanation of the process.

A Speaker Map mapping all of the loudspeakers within a room is provided in any suitable manner including those described above, with each speakers represented by a coordinate on the map. Depending on the type of Speaker Map, the coordinates can be 2-dimensional or 3-dimensional. For simplicity of explanation the present examples assume a 2-dimensional coordinate system.

Determination of the Source Origin

A Source Input is any audio that is played through the speakers. The Source Input can be a Stereo CD recording, or the 5.1 encoded audio format of a movie. For every audio format used, there are expected positions the speaker should be placed for accurate playback. The best practice is to place the speakers in the same position as the audio engineer has placed his recoding speakers as used when mixing the source content. When a Source Input is created, the audio engineer will mix the sounds into the available channels. The sounds are placed in the channel according to how the engineer determines that the Source Input should be presented to the listener. For instance, in a 5.1 recording, if a car horn was to appear form the left-rear, then the audio engineer will place the horn sound in the left-rear channel, if the car were to pan from the left front to the right font, the engineer would mix the channels to have the sound start in the left, then move to the center, and finally end up at the right front channel.

The Source Origin calculation determines where the Source Input was intended and then translates that to the Speaker Map. The calculation is done at runtime after that Source Input has been decoded and before the source is converted to analog signals that are to be sent to the speakers. The end result of the Source Origin calculation is to obtain a coordinate within the Speaker Map that represent where the source output should originate.

Source Origin Calculation

The calculation of a Source Origin can be accomplished in many ways. In a ideal situation, the Source Origin is embedded within the source audio stream. This is similar to directSound™ and OpenAL™, which are common in video game audio playback. By including the source origin into the stream, the calculation is reduced at runtime, but extra overhead is added into the creation of the audio. The particular format used for embedding this information is not critical and can be devised in any suitable manner without deviation from the principles discussed herein.

However, if it is not possible to include the source origin, then a signal origin can be constructed by determining the audio format (e.g., 2.0, 5.1, 7.1 channels) and determine from where a sound is expected to emanate by analysis of the signals of each channel. For instance a signal emitting only from the left front channel can be expected to be 30 degrees to the left of center in a 5.1 channel system. A signal from the center channel in a 5.1 system should be expected to be 0 degrees from the center. Similar to detecting phantom images, if the same signal is emitting from two channels, the Source Origin can be assumed to located at a suitable position between the two channels. Further analysis of amplitude and phase can determine where a more precise location of the Source Origin is to be situated.

Process Flow

The present example process uses three main variables: the location of the speakers, the location of the listeners, and the Source Origin. The location of the speakers and the listeners are provided by the Speaker Map. Since the Speaker map is predetermined and does not change unless the locations of the speaker or listener changes, the location of speakers and listeners are treated as static variables. The Source Origin is a runtime processing of the input source across all channels, stereo or surround. The Source Origin is the location where a listener will interpret the sound to originate from. An example of Source Origins is a voice that appears behind, to the side or in front of a listener. With the three variables, the process calculates the best speaker to output the source, and the best method to deliver the source.

A. Calculating which Speaker to Output the Source

To calculate which loudspeaker should output a given source, the Source Origin and the location of the loudspeakers are used. A comparison of the Source Origin and the speaker locations is used to determine which loudspeaker(s) the amplifier should direct signals to in order to produce the Source Output and realistically replicate the position of the Source Origin.

If a Source Origin and a speaker location overlap or are close to overlap, then that single speaker may be selected to output the sound from that Source Origin. If the Source Origin and any speaker's location do not overlap, the process determines if the Source Origin falls between any two loudspeakers. If the Source Origin does fall between two speakers, then the two speakers are used in a suitable mix to output the source. If there are multiple combination of speaker that the Source Origin falls between, the loudspeakers with the shortest distance between each other will be used. Lastly, if there is no direct speaker and the Source origin does not fall between the convex hulls of the speakers, then the process will determine which speakers are the closet to the Source Origin. The closest speakers are then used along with a head related transfer function to produce the output signals to the loudspeakers. This results in at least three techniques being used to produce output sounds.

1. Direct Sound Method

Figure 18:
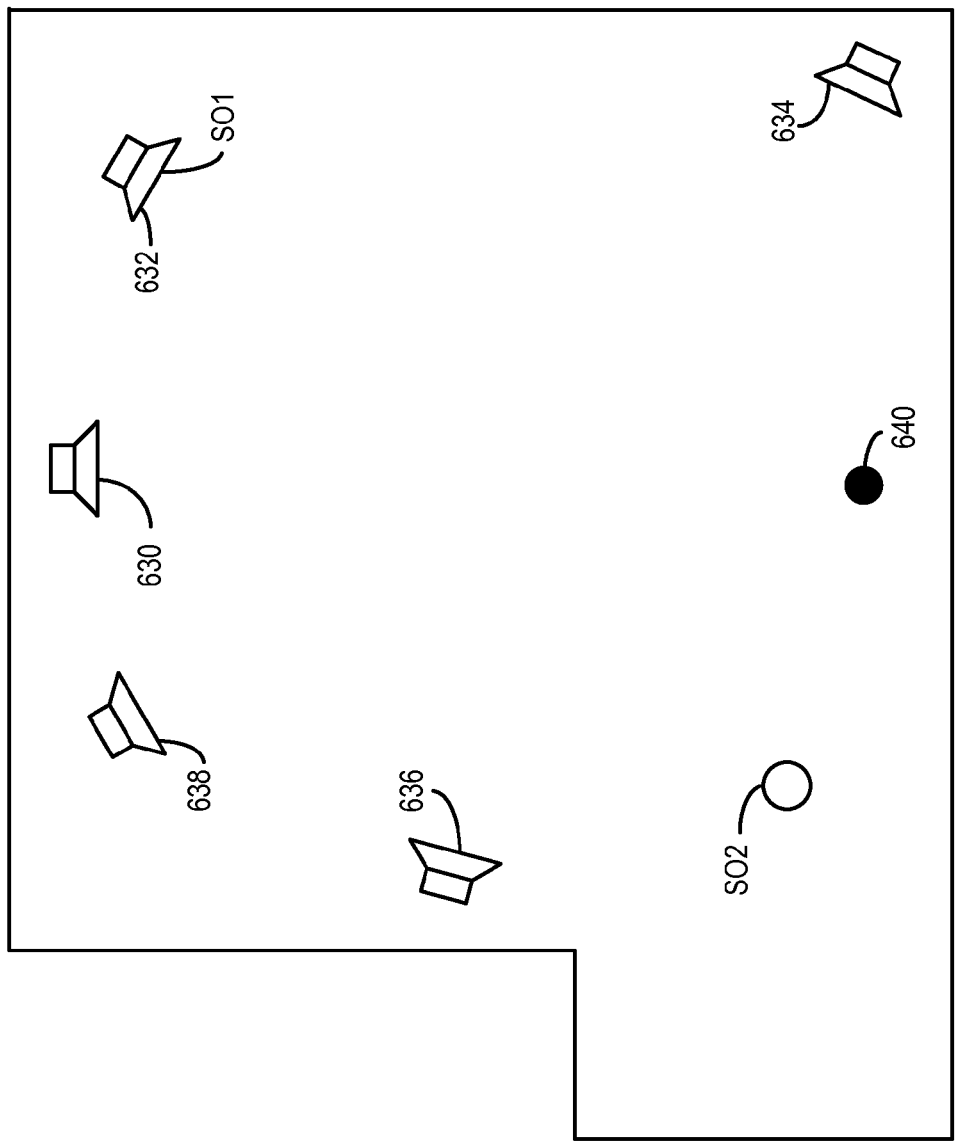
FIG. 18 is an example room layout depicting Source Origins in a first example consistent with certain embodiments of the present invention.

The Direct Sound Method is depicted in FIG. 18. In this illustration, each member of the array of loudspeakers is designated as 630, 632, 634, 636 and 638 respectively. The listening position is designated 640. These references designations will be used in each of FIGS. 18-20. Source Origin 1 (SO1) as shown overlaps with the physical location of loudspeaker 632, so the sound associated with SO1 can be directly output from loudspeaker 632. However, Source Origin 2 (SO2) does not overlap directly with any one loudspeaker and the direct sound method cannot be utilized. If the sound placement is to be realistic, another technique should be used for placement of SO2.

2. Phantom Imaging Method

Figure 19:
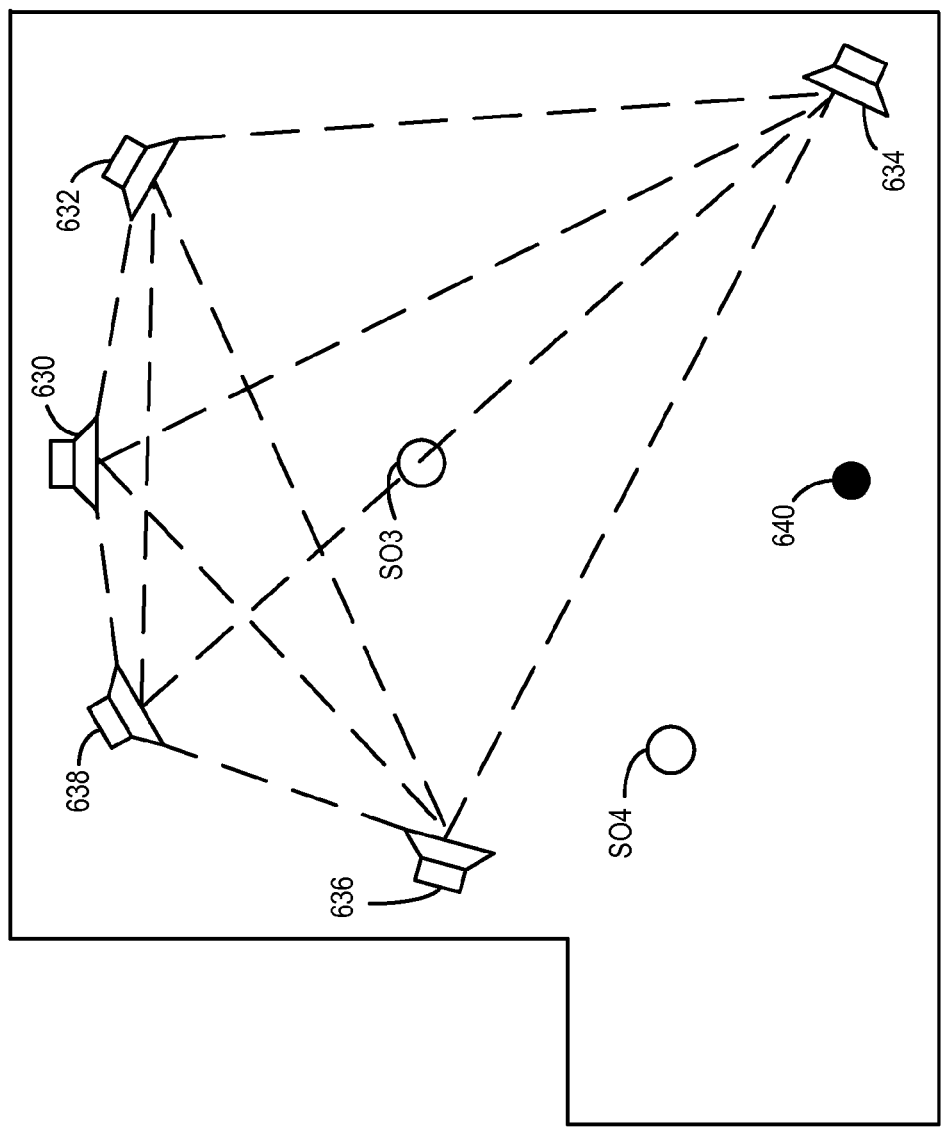
FIG. 19 is an example room layout depicting Source Origins in a second example consistent with certain embodiments of the present invention.

Referring to FIG. 19, in this example the Source Origin 3 (SO3) falls between the two loudspeakers 638 and 634, but Source Origin 4 (SO4) does not. Hence, in this example, phantom imaging can be used to simulate the presence of the sound at SO3 by use of loudspeakers 638 and 634, but phantom imaging cannot be used to effectively simulate the location of source origin SO4.

3. Head-Related Transfer Function Method

Figure 20:
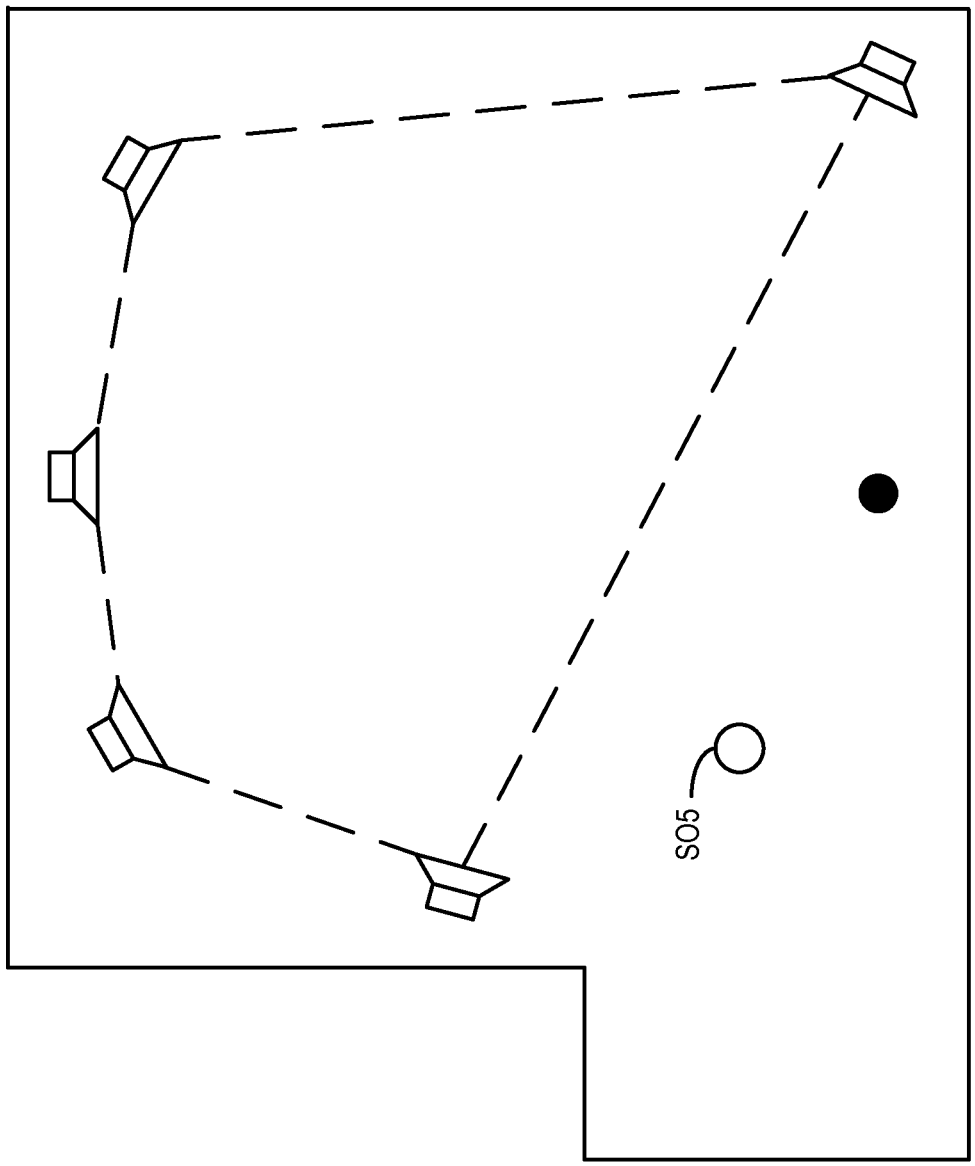
FIG. 20 is an example room layout depicting Source Origins in a third example consistent with certain embodiments of the present invention.

Referring to FIG. 20, Source Origin 5 (SO5) is outside of the Speaker array's convex hull as outlined by the dashed lines. Since neither the direct sound method nor the phantom imaging method can be used to simulate this sound, the sound emanating from SO5 can be simulated using the head related transfer function (HRTF) as will be described in greater detail below.

B. Determining which Method to Deliver the Source.

Once the output loudspeakers are chosen, a process consistent with certain implementations determines which method is best to deliver any particular sound. If the output is a single overlapping speaker, then the direct sound method is used. If the Source Origin is between two or more speakers then those loudspeakers are chosen and a phantom image is used. Lastly, if the closest speaker is used to output the Source Origin, then a Head-Related Transfer Function, or HRTF, is used to deliver the sound. The preferred sequence to determine which speaker or speakers are used, can find the most accurate method to create the Source Origin in the reproduced sound. Using a direct sound will provide a more accurate Source Origin then using a phantom image or HRTF and is simplest. Details of these delivery methods are described in the following section.

Figure 21:
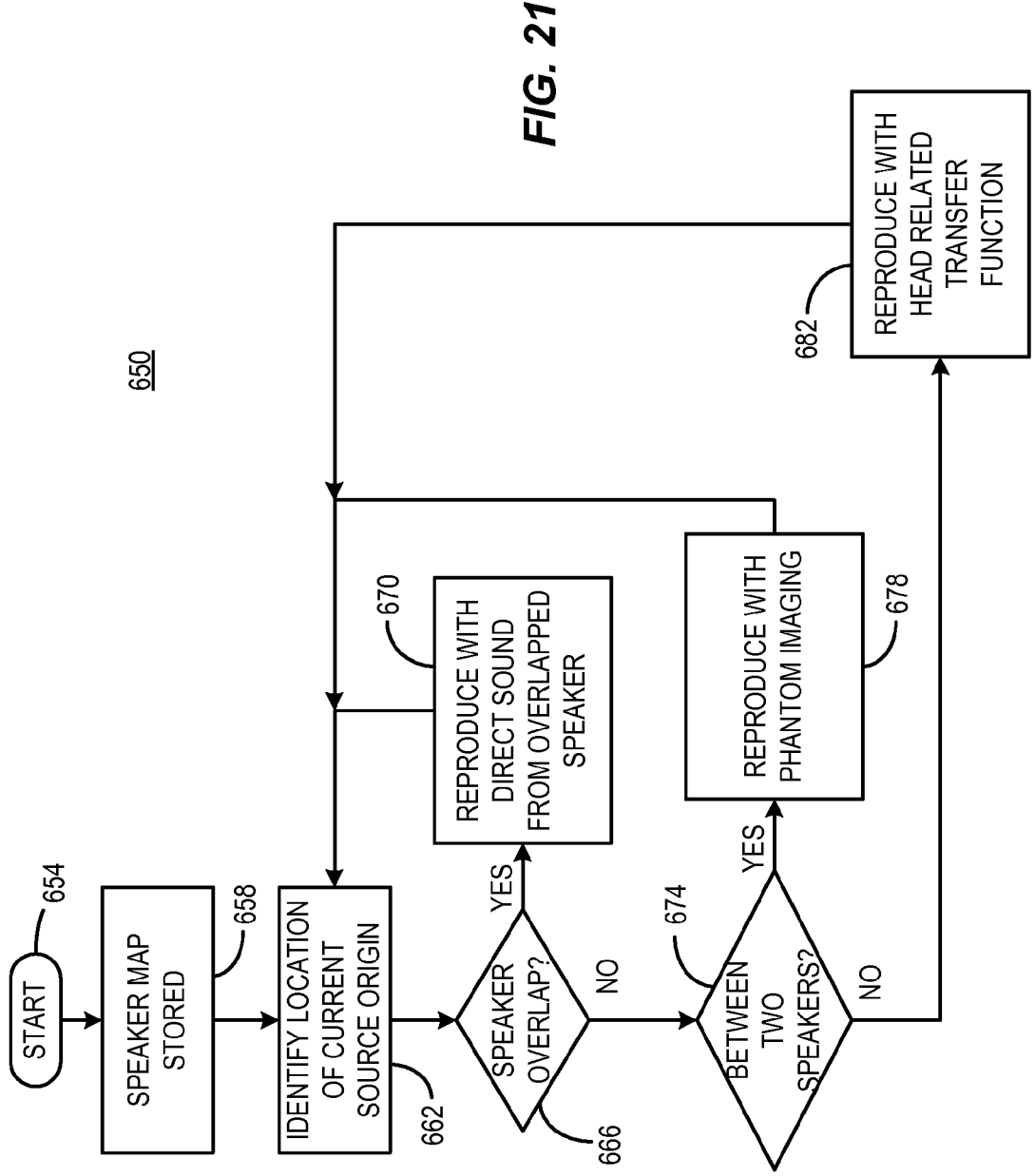
FIG. 21 is an example flow chart of a process for selection a Source Origin processing method consistent with certain embodiments of the present invention.

FIG. 21 depicts one example process 650 for making the determination of which speakers to use for a particular source origin starting at 654. Using a Speaker Map stored at 658 (and within the memory of the sound reproducing system) the system identifies the location of a current Source Origin at 662. This location is then compared with the Speaker Map to determine if the Source Origin directly or nearly directly overlaps with the physical location of a loudspeaker in the loudspeaker array as represented in the Speaker Map at 666. If so, the process utilizes that overlapping loudspeaker for direct sound reproduction at 670 and the process proceeds to the next Source Origin. However, if there is no direct or near direct loudspeaker overlap, the Source Origin is checked to see if it is situated directly between two or more loudspeakers in the loudspeaker array at 674. If so, phantom imaging is used at 678 to reproduce the sound from the Source Origin by simulating the position of the Source Origin, and the process proceeds to the next Source Origin. This process essentially produces a virtual speaker at a location of the source origin by manipulation of the amplitude and phase of the sound emanating from the two loudspeakers between which the Source origin lies. In the event the Source origin does not lie between any two physical loudspeakers at 674, the Source origin is simulated using the Head Related Transfer Function (HRTF) at 682 and the process returns to the next Source origin.

While the example shown and discussed is carried out in two dimensions, the process readily extends to three dimensions by taking the z dimension into consideration when making the determination of speaker overlap, speaker path location and the algorithm for phantom imaging and HRTF.

Methods of Sound Delivery

The methods of sound delivery alter the source input to generate a new source output. The method takes into consideration the location of the speakers, the location of the listener and each Source Origin. A goal of a delivery method is provide the most accurate sound possible. The output generated from each method should be consistent, meaning the listener should not be able to detect which method was used.

Each of the sound delivery methods has its own strengths and weaknesses, which is why the process determines which method to use at that particular instance. The three methods used are proven to work and implemented in various technologies.

A. Direct Sound from a Single Speaker.

If the Source Origin is expected to appear to come from a physical speaker location or approximately from the physical speaker's location, the process directs the sound to the proper speaker. In a simple case, this could involve sending the left channel to the left speaker or even redirecting the left channel entirely to a rear speaker. By allowing full channel redirection, the process provides the ability to rearrange the acoustic orientation of a room, without any physical change to the room or speakers as will be seen in an example later. It is noted that although direct assignment of a sound to a single speaker may not strictly be considered to be utilizing psychoacoustics, the term psychoacoustic will be deemed herein to apply to this direct speaker assignment for simplicity as has been previously discussed.

In a more complicated scenario, two (or potentially more) channels can be remixed to create a new virtual channel. Creating a new channel from two existing sources is not a new idea and is the basics for most audio codec, such as DTS Neo™ and Dolby Pro Logic™ codecs. To create a new channel from two existing channels, the process determines which parts are common between the two channels and excludes all the parts the channels do not have in common. The result of this calculation is a common channel that is used as a new Source Output. Also, the two original channels are adjusted to remove the common channel out of their channel. By knowing the location of the actual speaker, the channels inputs can be fine tuned to determine how much of each channel is used to make the new channel. The ability to control the channel mix provides the newly created channel with a more accurate sound output.

Direct sound generates very accurate Source Origins, but its use is generally limited to a small range of locations around the actual physical location of the loudspeakers, i.e. perhaps within about a one foot diameter around the loudspeaker's periphery. In an ideal environment, direct sounds will be the most often used method where possible. It is again noted that the direct sound method is considered a psychoacoustic herein even when only a single loudspeaker is used.

B. The Use of Phantom Images to Place a Sound in a Room.

When the Source Origin falls between two physical speakers, a phantom image can be used. (It is noted that situating the Source Origin between two physical loudspeakers is most common, but the process can be extended to generation of phantom images when the Source Origin is situated between more than two loudspeakers.) A Phantom image is a psychoacoustic effect where the listener localizes a sound in between two speakers. To create a phantom image, the two physical speakers are sent the identical source output. If the source output reaches the listeners at the same time, then the listeners will localize the sound's origin in the center of the two speakers. By applying the Law of First Wave-fronts (which states that the first wave front reaching the ear largely determines where a listener perceives a direction from which sound emanates) and level balancing, the sound can be altered so that the Source Origin appears closer to a speaker. By properly adjusting the source input, the Source Origin can originate in distinct positions along the path of the two speakers. As an example, a Source Origin can appear closer to one speaker, but at not exactly from that speaker, then move the origin to the center of the two speakers and finally end up at the other speaker. Use of this technique corresponds to a simple amplitude and phase/delay manipulation in the transfer functions used for the reproduction of the Source Origin of the two (or more) speakers being utilized.

Of the three methods, Phantom Images provide a balance between Source Origin accuracy and Source Origin placement. In real world environments, phantom Images will often be used.

C. The Use of HRTF to Place a Sound in a Room.

When the origin of the sound appears in a location where no physical speaker exists and is not between two physical speakers, a HRTF can be applied to a source input to make the sound appear at the intended Source Origin. The use of HRTF is common in so-called surround sound bars (a linear array of front speakers situated in a common enclosure), which try to recreate the 5.1 surround environment from a central position. HRTFs are filter functions that are applied to the input source as a transfer function and the output source generated contains certain psychoacoustic effects that cause the user to localize the sound in a different origin. The main difference between Phantom Images and HRTF is that Phantom Images require at least two speakers, but create a more stable Source Origin.

Because HRTF depends entirely on psychoacoustic effects, determining the correct HRTF to apply can be complicated. But, for purposes of this document it is sufficient to note that any suitable known HRTF or HRTF to be developed which provides suitable results can be utilized. A known issue with use of a HRTF source output is that when it sounds correct to one listener in one position, it may sound incorrect if the listener was to move positions, or in extreme cases simply move his head. Also, a HRTF source output that is correct to one listener can sound incorrect to the listener next to him. The simplest solution is to use a generalized HRTF such as those which are used in commercial products such as those produced by Sony Corporation, Dolby Labs, and SRS, for example. Other HRTF algorithms have been or can be derived, for example, from the CIPIC HRTF Database at the University of California Davis as discussed in "The CIPIC HRTF Database" by Algazi et al., IEEE Workshop on Applications of Signal Processing to Audio and Acoustics, 2001, which is hereby incorporated by reference thereto. Generalized HRTFs often sacrifice Source Origin accuracy somewhat in exchange for obtaining wider applicability to a wider range of listeners in a larger listening area. More complicated HRTF can take into account crosstalk from other speakers and even apply head tracking of individuals and real time changing of the HRTFs. Such HRTFs may be used, but disadvantages should be considered in choosing such a HRTF.

Because HRTF can provide unstable Source Origins, it is best used as a last resort. However, commercially available sound bars have proven that HRTFs can provide an accurate Source Origin when the proper HRTF is used. Since most rooms enclose the listener within a perimeter of loudspeakers, it is possible that the HRTF may be unnecessary in most Source Origins. It is also possible that when the HRTF does not apply appropriate results in a given room, the amplifier may be provided with the ability for the user to disable its use. In such case, process 650 can be modified accordingly so as to omit using the HRTF and use only the direct method or the phantom imaging method.

Thus, a method consistent with certain implementations involves in an audio system having an array of a plurality of loudspeakers and a stored speaker map as in 658 that identifies the geometric relationship between the plurality of loudspeakers and a listening position, identifying a location on the speaker map of a Source Origin of a sound; selecting a method of localizing the Source Origin from a plurality of methods of localizing the Source Origin utilizing the array of loudspeakers as in 662, 666 and 674; and reproducing the sound emanating from the Source Origin using the selected method as in 670, 678 or 682.

In certain implementations, the plurality of methods of localizing the Source Origin comprise direct sound reproduction from one of the loudspeakers, phantom imaging using two or more loudspeakers, and a head related transfer function as shown. In certain implementations, the reproducing comprises modification of a signal that produces a sound emanating from one or more of the loudspeakers by use of a transfer function that modifies a loudness and a delay of a resulting output audio sound.

Another method involves in an audio system having an array of a plurality of loudspeakers and a stored speaker map identifying the geometric relationship between the plurality of loudspeakers and a listening position, identifying a location on the speaker map of a Source Origin of a sound; determining if the Source Origin approximately overlaps a geometric location on the speaker map of one of the loudspeakers in the array, and if so reproducing sound from the Source Origin using the overlapping loudspeaker; if no loudspeaker overlaps the Source Origin, determining if the Source Origin is situated between two or more loudspeakers in the array, and if so reproducing the sound using phantom imaging to simulate the position of the Source Origin and reproducing the sound from the Source Origin; and if the Source Origin is not situated between the two or more loudspeakers in the array, using a head related transfer function to simulate the position of the Source Origin and reproducing the sound from the Source Origin. In certain implementations, where the determining and reproducing are carried out in the order claimed. In certain implementations, the reproducing comprises modification of signal that produces a sound emanating from one or more of the loudspeakers by use of a transfer function that modifies a loudness and a phase or delay of a resulting output audio sound.

Any of the above processes can be carried out using a tangible computer readable storage medium storing instructions that when carried out on one or more programmed processors forming a part of a camera device. The storage medium can be any suitable storage medium including so-called non-transitory storage media, where "non-transitory" is intended only to distinguish the term over transitory propagating signals.

In a certain implementations, a multi-channel audio amplifier has an interface such as 548 adapted to provide audio output signal to an array of a plurality of loudspeakers. An array of audio amplifiers such as 566 is coupled to the interface. A storage device such as 560 stores a speaker map identifying a geometric relationship between the plurality of loudspeakers and a listening position. One or more processors are programmed to: identify a location on the speaker map of a Source Origin of a sound; select a method of localizing the Source Origin from a plurality of methods of localizing the Source Origin utilizing the array of loudspeakers; and a signal representing the sound from the Source Origin being selected by the one or more processors to control the method of processing the sound as provided to the array of audio amplifiers for reproduction.

In certain implementations, the plurality of methods of localizing the Source Origin comprise direct sound reproduction from one of the loudspeakers, phantom imaging using two or more loudspeakers, and a head related transfer function. In certain implementations, the reproducing comprises modification of sound emanating from one or more of the loudspeakers by use of a transfer function that modifies a loudness and a delay of a resulting output audio sound.

Another multi-channel audio amplifier consistent with the above has an interface adapted to provide audio output signal to an array of a plurality of loudspeakers. An array of audio amplifiers is coupled to the interface. A storage device stores a speaker map identifying a geometric relationship between the plurality of loudspeakers and a listening position. One or more processors are programmed to: identify a location on the speaker map of a Source Origin of a sound; determine if the Source Origin approximately overlaps a geometric location on the speaker map of one of the loudspeakers in the array, and if so select the overlapping loudspeaker for reproduction of the sound from the Source Origin; if no loudspeaker overlaps the Source Origin, determine if the Source Origin is situated between two or more loudspeakers in the array, and if so selecting a phantom imaging process to simulate the position of the Source Origin for reproduction of the sound from the Source Origin; and if the Source Origin is not situated between the two or more loudspeakers in the array, select a head related transfer function to simulate the position of the Source Origin for reproduction of the sound from the Source Origin; and direct a signal representing the sound from the Source Origin using the selection made by the one or more processors to control the sound as provided to the array of audio amplifiers for reproduction.

In certain implementations, the determining and selecting are carried out in the order described. In certain implementations, the reproducing involves modification of sound emanating from one or more of the loudspeakers by use of a transfer function that modifies a loudness and a delay of a resulting output audio sound.

Real World Applications

In this section, several different applications are described for an example process. Although based on existing technology, the present process combines multiple technologies to create a seamless, accurate sound reproduction. To the general consumer, the benefits of this product range from greater ease of use to broader range of flexibility and sound quality. To the manufacturer, the process provides a flexible platform that can be used in various products as well as cut cost and generate new business ventures.

A. Compensating for Oddly Place Speaker Configuration

As describe before, room calibration is a common feature in many home A/V products, specifically the A/V receiver (which includes a multi-channel audio amplifier as has been discussed). Although these calibrations are becoming more robust, they do not fully take advantage of the Speaker's location. The present processes provide an encompassing solution that handles all cases that a sound can be reproduced. The processes also operate to on choose a suitable method to the Source Origin where current room calibration methods only utilize a single simplified loudness adjustment.

B. Providing a Scalable Audio System.

It is currently difficult for a consumer to upgrade his home audio system. A consumer that starts with a TV and sound bar would need to buy an A/V receiver to incorporate floor speakers, and possibly buy a new receiver if he chooses to go to 5.1 or 7.2 channels.

Because the present process decouples the Source Output and the Source Input, the process creates a generic method of upgradeability. By incorporating wireless speaker technology, speakers can be added or removed into a room and not require the need for other changes to the hardware. The process can handle any arbitrary number of loudspeakers with the addition of more loudspeakers being independent of any coding and with more loudspeakers serving to improve sound accuracy of the system.

C. Full Remapping of Speakers in a Room

Decoupling the Source Input and Output has also provided a unique ability. No longer are channels directly tied to specific channels. One unique feature is that the user no longer needs to wire the speaker to the correct channel. Whether wired connection or wireless, the Speaker Map defines the physical geometric location where the speaker is placed and therefor sends a Source Output to an appropriate speaker or speakers. For a general application, an A/V receiver can be completely wireless with no speaker connection necessary; or, an A/V receiver simply permits the consumer to connect the speakers, without specify which connectors correspond to any particular speaker in the system.

Figure 22:
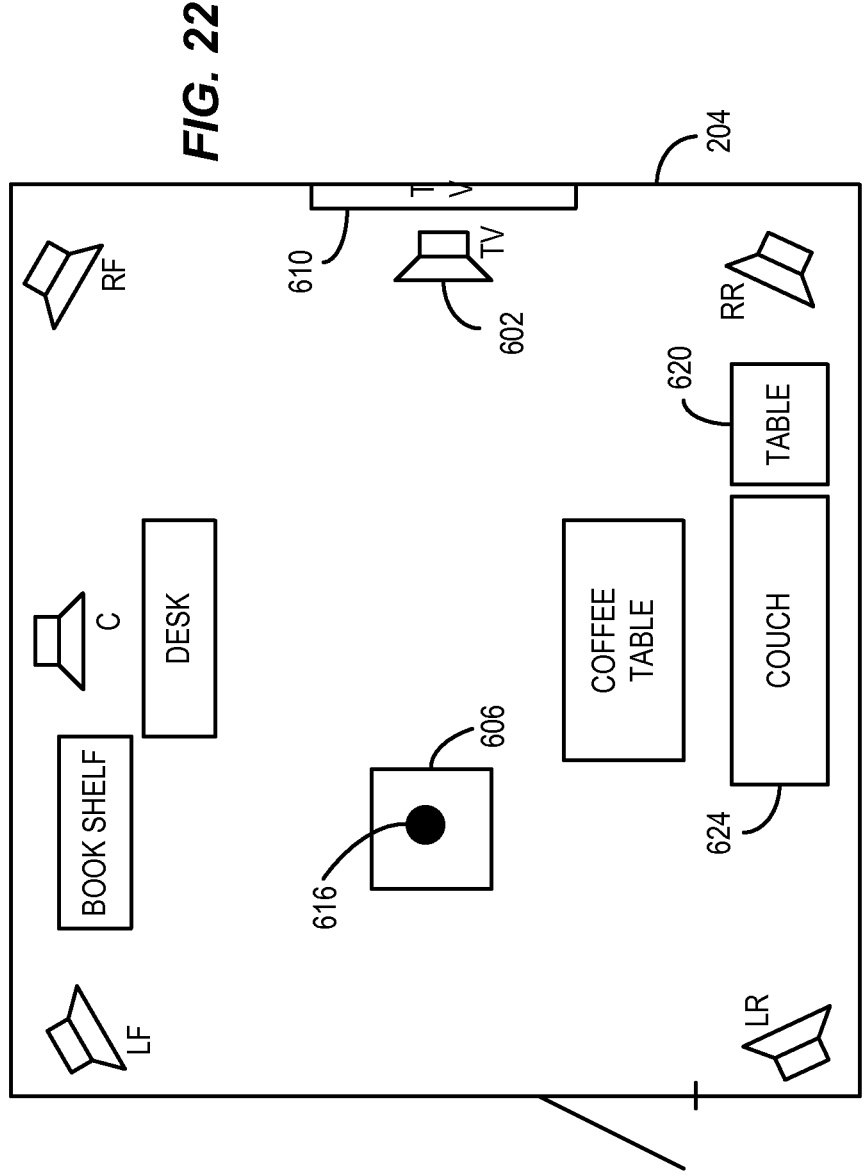
FIG. 22 is an example of a room layout with a listener in a television listening position consistent with certain embodiments of the present invention.
Figure 23:
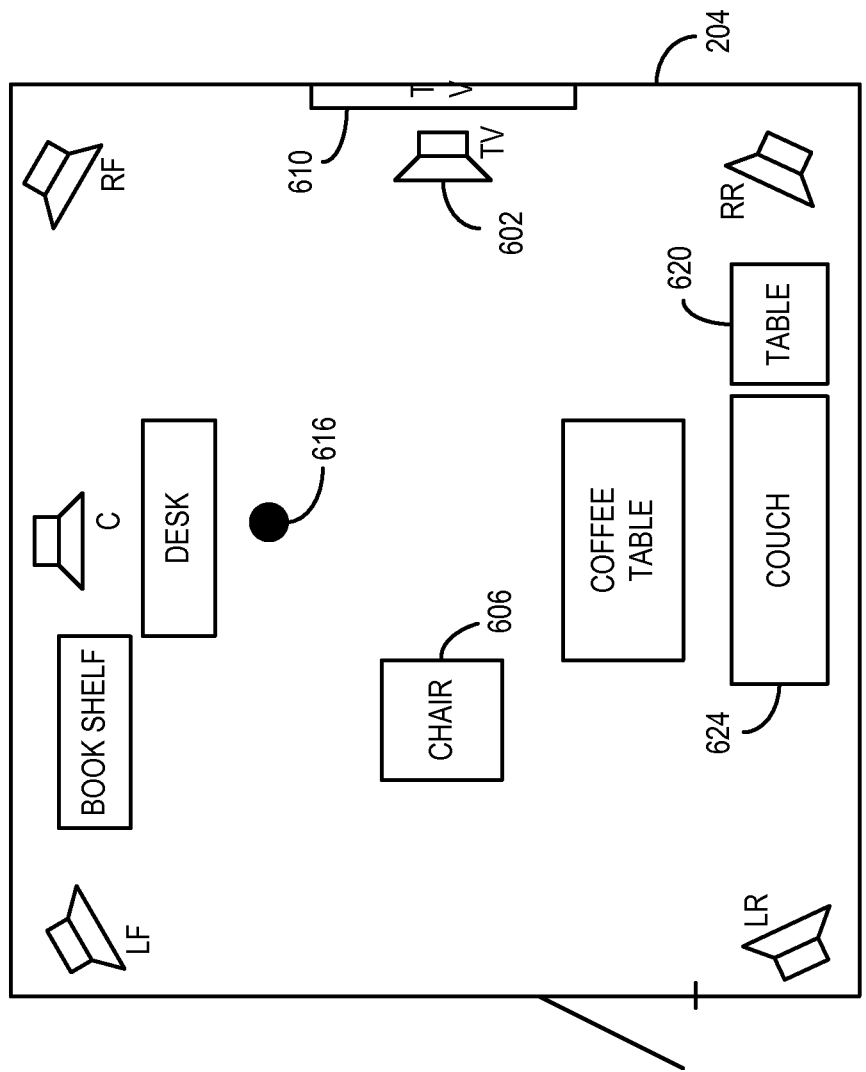
FIG. 23 is an example of a room layout with a listener in a computer listening position consistent with certain embodiments of the present invention.

Another unique ability is to be able to repurpose the speakers depending on the user's preference. By redirecting which Source Output goes where, the user can take advantage of the room's layout. If the user has multiple audio systems in a single room, such as a PC, a TV or projector, the speakers can be remapped to reorient to whichever system the user is currently using. For example, in FIG. 22, the listener 616 is in a TV listening orientation within chair 606 and the loudspeakers are mapped to fit the usage for viewing TV. In contrast, in FIG. 23, the listener 616 is in a PC listening orientation—perhaps playing video games. In this case, the loudspeakers can be remapped to fit the usage in the PC listening orientation.

D. Removing 3rd Party Codec

Another benefit of certain implementations of the present process is the ability to handle a raw Source Input. As long as a Source Origin can be created, the process is able to reproduce the proper sound. If an audio source provided raw sound files and the coordinates to place the sound, then the process can still create a valid Source Origin and accurately reproduce the sound.

This provides the audio engineer a new method to engineer a recording. He is no longer concerned about how to down mix his sounds into appropriate channels, but can simply focus on where he wants the sound to originate from. This also eliminates the need remix the audio channels for 5.1, 7.2 or 10.4 since the reproduction is adaptive to the existing loudspeaker placement. Lastly this removes the need for audio encoders and decoders which can cut down the cost of producing audio content as well as the cost of the devices to playback the content.

Those skilled in the art will recognize, upon consideration of the above teachings, that certain of the above exemplary embodiments are based upon use of one or more programmed processors programmed with a suitable computer program. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments. Instructions used to control a programmed processor in accord with the present teachings may be any suitable device that behaves as a suitable computer readable storage medium such as a non-transitory computer readable storage medium, where "non-transitory" is only intended to exclude transitory propagating signals and does not exclude storage that is transient by virtue of reprogramming or deletion when power is removed such as in the case of random access memory.

While certain illustrative embodiments have been described, it is evident that many alternatives, modifications, permutations and variations will become apparent to those skilled in the art in light of the foregoing description.

What is claimed is:

1. A method, comprising:
presenting a graphical user interface (GUI) on a display device, wherein the GUI presents a drag and drop menu and a visual representation of a room, wherein the drag and drop menu comprises a plurality of selectable objects for placement at a plurality of selected positions within the visual representation of the room, and wherein the plurality of selectable objects comprises a plurality of loudspeakers;

receiving a plurality of characteristics for the plurality of loudspeakers placed at the plurality of selected positions within the visual representation of the room, wherein the plurality of characteristics is determined from one or more visual indicators included in captured photographic images of the plurality of loudspeakers;

determining, from the captured photographic images of the plurality of loudspeakers, a geometric configuration representing a positioning of the plurality of loudspeakers in a three-dimensional space, and at least one characteristic of the plurality of characteristics; and generating an acoustic model of the room and psycho-acoustic transfer functions, based on the plurality of characteristics for the plurality of loudspeakers, for determining virtual relocation of the plurality of loudspeakers to generate a psycho-acoustic effect.

2. The method according to claim 1, wherein at least one of the plurality of selectable objects comprises a room furnishing.

3. The method according to claim 2, further comprising providing, by the GUI, a selection of a characteristic of the room furnishing.

4. The method according to claim 1, further comprising receiving, by a controller in the display device, a user input.

5. The method according to claim 1, further comprising constructing a speaker map representing a geometric placement of the plurality of loudspeakers placed within the room.

6. The method according to claim 1, wherein the display device comprises a controller for adjusting size and shape of the visual representation of the room, wherein the controller comprises a television remote controller.

7. The method according to claim 1, further comprising generating the psycho-acoustic transfer functions for each audio channel to compensate for characteristics of the virtual representation of the room and sub-optimal placement of the plurality of loudspeakers.

8. The method according to claim 1, wherein the captured photographic images of the plurality of loudspeakers are captured using a camera.

9. A non-transitory computer readable storage medium having stored thereon, instructions being executable by one or more programmed processors to perform steps comprising:

presenting a graphical user interface (GUI) on a display device, wherein the GUI presents a drag and drop menu and a visual representation of a room, wherein the drag and drop menu comprises a plurality of selectable objects for placement at a plurality of selected positions within the visual representation of the room, and wherein the plurality of selectable objects comprises a plurality of loudspeakers;

receiving a plurality of characteristics for the plurality of loudspeakers s placed at the plurality of selected positions within the visual representation of the room, wherein the plurality of characteristics is determined from one or more visual indicators included in captured photographic images of the plurality of loudspeakers;

determining, from the captured photographic images of the plurality of loudspeakers, a geometric configuration representing a positioning of the plurality of loudspeakers in a three-dimensional space, and at least one characteristic of the plurality of characteristics; and generating an acoustic model of the room and psycho-acoustic transfer functions, based on the plurality of characteristics for the plurality of loudspeakers, for determining virtual relocation of the plurality of loudspeakers to generate a psycho-acoustic effect.

10. An apparatus, comprising:
one or more processors operable to:
present a graphical user interface (GUI) on a display device, wherein the GUI presents a visual representation of a room that is adapted to be adjusted in size and shape by a controller, wherein the GUI comprises a drag and drop menu comprising a plurality of selectable objects, wherein the plurality of selectable objects are selected for placement at a plurality of selected positions within the visual representation of the room, wherein the plurality of selectable objects comprises a plurality of loudspeakers;

receive a plurality of characteristics for the plurality of loudspeakers placed at the plurality of selected positions within the visual representation of the room, wherein the plurality of characteristics is determined from one or more visual indicators included in captured photographic images of the plurality of loudspeakers;

determine, from the captured photographic images of the plurality of loudspeakers, a geometric configuration representing a positioning of the plurality of loudspeakers in a three-dimensional space, and at least one characteristic of the plurality of characteristics; and generate an acoustic model of the room and psycho-acoustic transfer functions, based on the plurality of characteristics for the plurality of loudspeakers, for determining virtual relocation of the plurality of loudspeakers to generate a psycho-acoustic effect.

11. The apparatus according to claim 10, wherein at least one of the plurality of selectable objects comprises a room furnishing.

12. The apparatus according to claim 11, wherein the GUI provides for selection of a characteristic of the room furnishing.

13. The apparatus according to claim 10, wherein the display device comprises a controller for receiving a user input.

14. The apparatus according to claim 10, wherein the one or more processors are operable to construct a speaker map representing a geometric placement of the plurality of loudspeakers placed within the room.

15. The apparatus according to claim 14, wherein the speaker map is stored in a memory.

16. The apparatus according to claim 10, wherein the one or more processors are embedded within a multi-channel audio amplifier.

17. An apparatus, comprising:
one or more processors residing within a multi-channel audio amplifier being operable to:
control a television display to present a graphical user interface (GUI) on the television display, wherein the GUI presents a visual representation of a room that is adapted to be adjusted in size and shape, wherein the GUI comprises a drag and drop menu adapted to select an object from a plurality of selectable objects for placement at a selected position within the visual representation of the room, wherein the plurality of selectable objects comprises a plurality of loudspeakers, receive a plurality of characteristics for the plurality of loudspeakers, wherein the plurality of characteristics is determined from one or more visual indicators included in captured photographic images of the plurality of loudspeakers, wherein the plurality of loudspeakers are placed within the visual representation of the room;

determine, from the captured photographic images of the plurality of loudspeakers, a geometric configuration representing a positioning of the plurality of loudspeakers in a three-dimensional space, and at least one characteristic of the plurality of characteristics; and generate an acoustic model of the room and psycho-acoustic transfer functions, based on the plurality of characteristics for the plurality of loudspeakers, for determining virtual relocation of the plurality of loudspeakers to generate a psycho-acoustic effect.

18. The apparatus according to claim 17, wherein at least one of the plurality of selectable objects comprises a room furnishing.

19. The apparatus according to claim 17, wherein the GUI provides for selection of a characteristic of the room furnishing.

* * * * *